(12) United States Patent
Greer

(10) Patent No.: US 8,041,651 B2
(45) Date of Patent: Oct. 18, 2011

(54) METHOD FOR EXTRACTING SPATIAL KNOWLEDGE FROM AN INPUT SIGNAL USING COMPUTATIONAL MANIFOLDS

(76) Inventor: Douglas S. Greer, Carlsbad, CA (US)

( * ) Notice: Subject to any disclaimer, the term of this patent is extended or adjusted under 35 U.S.C. 154(b) by 0 days.

(21) Appl. No.: 12/861,697

(22) Filed: Aug. 23, 2010

(65) Prior Publication Data

US 2010/0316283 A1 Dec. 16, 2010

Related U.S. Application Data

(63) Continuation of application No. 11/749,076, filed on May 15, 2007, now Pat. No. 7,805,386.

(60) Provisional application No. 60/801,026, filed on May 16, 2006, provisional application No. 60/862,038, filed on Oct. 18, 2006.

(51) Int. Cl.
*G06F 15/18* (2006.01)
*G06E 3/00* (2006.01)
*G06N 3/06* (2006.01)
*G06N 3/08* (2006.01)
*G06K 9/62* (2006.01)

(52) U.S. Cl. ............. 706/12; 706/22; 706/25; 706/27; 706/30; 382/158; 382/159

(58) Field of Classification Search .............. 706/12
See application file for complete search history.

(56) References Cited

OTHER PUBLICATIONS

MacLennan, Field Computation in Natural and Artificial Intelligence Extended Version [online], 1999 [retrieved on Jun. 3, 2011]. Retrieved from the Internet< URL:http://citeseerx.ist.psu.edu/viewdoc/summary?doi=10.1 .1.55.9071>.*
Ritter, Recursion and Feedback in Image Algebra [online], 1990 [retrieved on Jun. 3, 2011]. Retrieved from the Internet:< URL:http://spiedigitallibrary.org/proceedings/resource/2/ psisdg/1406/1/74_1>.*
Humpert, Bidirectional Associative Memory With Several Patterns [online], 1990 [retrieved on Jun. 3, 2011]. Retrieved from the Internet< URL:http://ieeexplore.ieee.org/xpls/abs_all.jsp?arnumber= 137657>.*
Greer, A Unified System of Computational Manifolds [online], 2003 [retrieved on Jun. 3, 2011]. Retrieved from the Internet<URL:http://www.gmanif.com/pubs/TR-CIS-0602-03.pdf>.*
Greer, An Image Association Model of the Brodmann Areas [online], 2007 [retrieved on Jun. 3, 2011]. Retrieved from the Internet:<URL:http://ieeexplore.ieee.org/xpls/abs_all.jsp?arnumber=4341934>. (Date for Greer'03).*

* cited by examiner

*Primary Examiner* — Jeffrey A Gaffin
*Assistant Examiner* — Nathan Brown, Jr.
(74) *Attorney, Agent, or Firm* — Eleanor M. Musick; Procopio, Cory, Hargreaves & Savitch LLP

(57) ABSTRACT

A processor architecture for a learning machine is presented which uses a massive array of processing elements having local, recurrent connections to form global associations between functions defined on manifolds. Associations between these functions provide the basis for learning cause-and-effect relationships involving vision, audition, tactile sensation and kinetic motion. Two arbitrary input signals hold each other in place in a manifold association processor and form the basis of short-term memory.

4 Claims, 8 Drawing Sheets

Input Layer      Hidden Layer      Output Layer

METHOD FOR EXTRACTING SPATIAL KNOWLEDGE FROM AN INPUT SIGNAL USING COMPUTATIONAL MANIFOLDS

RELATED APPLICATIONS

This application is a continuation of U.S. application Ser. No. 11/749,076, filed May 15, 2007, which claims the benefit of the priority of U.S. Provisional Applications No. 60/801,026, filed May 16, 2006, and No. 60/862,038, filed Oct. 18, 2006, each of which is incorporated herein by reference in its entirety.

FIELD OF THE INVENTION

The present invention relates to a physiologically realistic model for neurons and neurotransmitters and use of such a model in image and signal analysis and for data storage.

BACKGROUND OF THE INVENTION

Since its inception over fifty years ago, the field of artificial intelligence has remained separated from the field of psychology by the fundamental mathematical dichotomy between the discrete and the continuous. While computer scientists regard symbols as discrete bit patterns, psychologists regard them as continuous visual icons. The substitution of integral signs for summation signs sometimes serves to create a bridge across this dichotomy, for example, between the continuous and discrete versions of the Fourier transform.

It is easier to design a symbol processing system on a digital computer by representing symbols as discrete bit patterns, than to design a system that represents symbols as cumbersome digitized images. In biological systems, the central nervous system (CNS) represents and operates on symbols as continuous images because it was forced to do so. Throughout the course of evolution, everything in nature, predator and prey, the external environment and the body itself, was governed by the laws of physics, which are based on functions defined in space and time. In the struggle to survive, an organism had to process, as quickly as possible, continuous symbol representations.

The lack of a complete and thorough scientific understanding of animal intelligence and human consciousness has limited the ability to build computer systems that mimic these capabilities. The present invention provides a new model that may provide insight into how to design such systems. The design connects together a massive number of relatively small processing elements to form a large recurrent image association system. It is completely parallelizable, and all of the computations take place recursively over small, localized regions.

The mathematical definition of a manifold is a metric space, which is everywhere locally homeomorphic to an open set in $R^n$, where R denotes the real numbers (Spivak, 1979; Schutz, 1980). Less formally, we can regard a one-dimensional manifold as a smooth curve, a two-dimensional manifold as a smooth surface, akin to a deformed balloon, and analogously for higher order manifolds. In order to accommodate discontinuities in the real world, we use Borel measurable functions to represent data, and define operations using Lebesgue integrals (Kolmogorov & Fomin, 1970; Royden, 1988). For brevity, in the following discussion, we will refer to generalized or Borel measurable functions simply as functions.

Since open regions of space, time and frequency as well as their product spaces are all manifolds, one can accurately describe virtually everything in nature, as a function defined on a manifold. At the level of quantum physics, matter and energy are discrete. Nevertheless, as is the case for the electrons that define the current density J in Maxwell's equations, and the molecules that define the density of matter $\rho$ in the Navier-Stokes equations, at the macroscopic level these quantities are differentiable.

BRIEF SUMMARY OF THE INVENTION

The inventive model differs from previous work on neural fields in that it does not attempt to describe the mean firing rate of neurons as a continuous field. Instead, a model is described in which the dendritic tree of a neuron behaves as if the concentration of neurotransmitters surrounding it in the extracellular space is a continuous field.

According to the present invention a neural model is constructed from two stateless logic gates, and incorporates a recursive feedback loop where a single bit and its complement hold each other in place. A fundamental unit of digital memory, the SR flip-flop, is capable of storing a single bit of information. The invention defines a continuous version of this unit of memory which uses two reciprocal images to hold each other in place using an analogous recursive feedback loop. The Brodmann areas, the constituent parts of the cerebral cortex, are physiological realizations of these reciprocal image memories.

For brevity, we use the term image to denote a scalar or vector valued function defined on a two-dimensional manifold, for example an open, connected region of a plane. In the realm of natural computation, this general notion of an image plays a role that extends beyond computer vision. For example, an audio spectrogram that represents time in the horizontal dimension and frequency in the vertical dimension is a two-dimensional image. Similar tonotopic maps exist at several locations in the CNS. In this context, learning and retrieving image associations is a basic cognitive function. For example when a child learns a new word, say "horse", they learn an association between two images: the visual image of a horse and the two-dimensional audio spectrogram of the sound of the word "horse".

The generalization of images to include any function defined on a two-dimensional manifold is a powerful one in terms of its ability to describe and model many known neuroscientific phenomena. For example, the surface of the skin is a two-dimensional somatosensory image and its location in three-dimensional space is a vector valued function defined on the same image domain. The union of the cross-sections of all muscles forms a somatotopic image.

We can easily extend all of the algorithms presented here from images to generalized functions defined on any n-dimensional manifold. Therefore, we use the term Manifold Association Processor (MAP) to denote a device that is capable of directly forming and retrieving associations between images.

The exemplary embodiments include three types of Manifold Association Processors. The first two MAP descriptions are abstract and are intentionally defined only in terms of their external, observable behavior. The first of these, the Λ-MAP model, is stateless but can perform logic operations by producing the output image that is associated with multiple input images. Two recursively-connected Λ-MAPs form the SR-MAP, which is analogous to a set-reset (SR) flip-flop where we replace the individual bits with two-dimensional images and the NAND gates with Λ-MAPs. The Ψ-MAP description is concrete and specifies the internal principles of operation. Its unique design uses recurrent interconnections to integrate the results of many locally connected processing elements and thereby form an overall global association between two arbitrary images.

Borrowing from the terminology of digital design, specifically a programmable logic array, we use the term Ψ-MAP Array to designate an interconnected collection of Ψ-MAPs where the bits are again replaced by images. A Ψ-MAP is a model of a single Brodmann area. An array of interconnected Ψ-MAPs models the entire collection of Brodmann areas that make up the neocortex.

Without recurrence, locally connected neurons could not establish intelligible and meaningful associations on a global scale. However, the spectral representation of data allows a massive number of parallel processors, with local recursive connections, to operate in concert and find the associations between the reciprocal images that constitute the core of the Brodmann areas. The union of these mutually reinforcing image pairs covers the entire cerebral cortex and is the basis of short-term memory. This memory, combined with the ability to focus attention on select regions and search for new associations provides the foundation that underlies cognition and rational thought.

Random coincidences do happen and we must be careful not to impart too much importance to a chance occurrence. However, so many correlations between a new model and previously unexplained, general neurological facts, suggests the need for additional analysis and further consideration.

BRIEF DESCRIPTION OF THE DRAWINGS

The present invention will be more clearly understood from the following detailed description of the preferred embodiments of the invention and from the attached drawings, in which:

FIG. 2a illustrates two inverters and FIG. 2b illustrates two NAND gates forming a SR flip-flop.

DETAILED DESCRIPTION OF THE PREFERRED EMBODIMENTS

Figure 1:
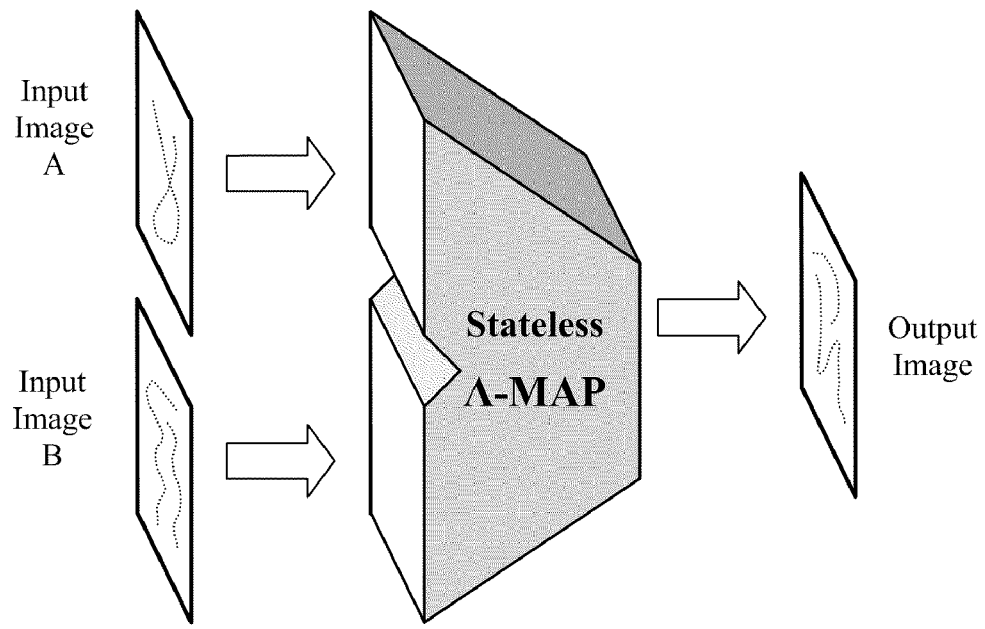
FIG. 1 illustrates the abstract Logic Manifold Association Processor producing an output image from input images.

Definitions: For purposes of the description of the invention, the following definitions are used:

A "neighborhood" of x is an open set containing x.

A "manifold" is a metric space M with the property that for every x in M there is a neighborhood U of x and an integer $n \geq 0$ such that U is homeomorphic to $R^n$. Examples of manifolds include open subsets of time, space and frequency as well as their product spaces. Examples of two-dimensional manifolds (n=2) include the plane, a disk, the surface of a sphere or the surface of a torus.

The term "measure" is assumed to mean a "signed measure" that is one that can take negative values. A signed measure can be evaluated as the difference of two nonnegative measures.

The terms "image" and "signal" refer to any scalar or vector-valued function defined on any manifold of any dimension. For purposes of the instant description, the terms "image" and "signal" may be used interchangeably, such that a description of steps for processing an image may be applied equally to processing of a signal, and vice versa.

A "neural manifold" is the continuous counterpart to a neural network. It defines a mapping between functions defined on the input manifold to functions defined on the output manifold. The mathematics of neural networks generalizes to neural manifolds the way the inner product in a Hilbert space applies equally well to either the sum of the products of the coefficients of two vectors (neural network) or to the integral of the product of two functions (neural manifold). We extend the term neural manifold from the case of a finite number of weights to the case of an infinite number of weights corresponding to the values of a function defined on a manifold.

A "pixel" or "voxel" signifies a discretized sample taken from an image or signal. The sampling of the manifold may be on a grid which is regular or irregular, that is the pixels need not represent areas which are uniform in size or shape. A pixel may be a vector of real values, e.g. red, green and blue channels of a color photograph. The components of the vector may also represent averages or derivatives over regions of the images.

A "processing element" is a computational unit similar to a neuron. It is not intended to mean a digital computing element such as a microprocessor. A single microprocessor or CPU (central processing unit) may simulate the computations of many processing elements.

A "null image" is a predefined image that is regarded as blank or containing no information. For example, an image that was completely white, black or some predefined shade of grey could be used as a null image.

"Image representation" is a general term used to signify either an image or its isomorphic representation. The isomorphic representation may, for example, be the result of applying a spectral transform, such as the Fourier transform or the wavelet transform, to the image.

The "solution space" is a subset of the set of all possible images, or image spectra that correspond to correct or valid images.

"Reciprocal images" or "image pair" means two images defined on two manifolds where each image when applied as an input to one of the two Λ-MAPs produces the other as an output. The two manifolds may or may not have similar types and dimensions. The two images are referred as the first and second images of an image pair.

A "function space" is a set of functions that all have the same domain and range (co-domain). Specific functions may be referred to as "points" or "elements" in a function space.

"Encoding" is defined as a transformation of functions. Mathematically, it is a mapping from one function space to another function space.

"Topological alignment" refers to a combination of many functions that all have the same domain (input manifold). The outputs of the multiple functions are combined by constructing a new vector-valued function that maps inputs to the Cartesian product space of the individual function co-domains.

A collection of reciprocal image pairs is a set of reciprocal images where the functions that make up the first image of each pair all have the same domain and range, and the functions that make up the second images also all have the same domain and range.

To facilitate understanding of the present invention, it is helpful to describe some of the relevant research that is taking place, and compare it with the Ψ-MAP algorithms of the invention by looking at some of their important characteristics and analyzing them sequentially. The first of these characteristics is the process of converting logic into memory.

Willshaw (1969) first proposed a model of associative memories using non-holographic methods. By definition, any function, which maps elements of one set to elements of another set, performs an association operation and is therefore an abstract associative memory. The ability of neural networks to approximate functions allows them to be used as concrete associative memory implementations. Recurrent neural networks (RNNs) overcome some of the limitations of feed-forward designs and model the characteristics of a system over time.

A second type of associative memory results from following the trajectory of a particle in a dynamical system. A simple recurrence of the form $x_{i+1}=f(x_i)$ is the basis for RNN associative memories where the association is between an initial state and the final state determined by recursive iterations. Consequently, the association is not a fixed static relationship, but a trajectory representing the time behavior of a state variable as it moves through a multidimensional space. To distinguish between these two types of association mechanisms we will refer to the second type, which follows the trajectory of a point in a dynamical system, as a classification. Each unique fixed point identifies a class that equals the set of all points whose trajectory leads to that point.

Direct application of this technique has been used to create image classification systems. Dynamic-system associations formed in the spectral domain can reduce noise in communication applications.

The network weights, learned during the training process, act as long-term memory capable of recalling associations, but cannot serve as the working memory required for computations. Short-term or working memory serves as state to represent the objects or variables currently under consideration. This generally takes the form of fixed-points for some function $f$ in the form $x=f(x)$ where this equation has multiple stable values. For example, if $\neg(\ )$ is the "not" or inverse Boolean operation, an SR flip-flop implements the recurrent relation $x=\neg(\neg(x))$, which has two stable fixed points: zero and one. As a practical matter, to maintain state indefinitely in actual implementations, f must also provide some amplification in order to overcome the effects of diffusion.

The Ψ-MAP associations, like the recurrence relation for the RS flip-flop, can be divided into a pair of mutually recurrent functions of the form $y=f(x)$ and $x=g(y)$, which implies $x=g(f(x))$. In the case of a flip-flop, x and y are Boolean variables, while in the case of a Ψ-MAP they are functions defined on a manifold. These complementary or reciprocal relations statically retain their state and create a short-term working memory. In an SR flip-flop, the functions $f$ and g correspond to NAND (inverter) gates, while in a Ψ-MAP they correspond to Λ-MAPs.

The stable fixed points often correspond to the corners of a hypercube where the component values have been saturated or clipped. For example, a flip-flop can be viewed as a one-dimensional hypercube. This contrasts with the Ψ-MAP design where the stable states correspond to grayscale (non-saturated) images.

The Ψ-MAP design includes both a classification and an association. Initially, each Ψ-MAP goes through a classification phase where the initial inputs progress along a trajectory to a stable fixed point. However, once the fixed point is reached, the mutually recurrent relationships define an explicit and static association between x and y. In this respect, they are similar to bidirectional associative memories.

Bidirectional Associative Memories (BAMs), first described by Kosko (1988), explicitly define a mutually recurrent relationship. Subsequent research has further developed BAM implementations of associative memories. Shen and Balakrishnan (1998) used two mutually recurrent neural networks in a control system application. All of these networks require global connectivity, that is, each output is a function of each of the inputs.

The BAM image association methods require global connections to the entire input image; each output pixel directly depends on all the input pixels. Consequently, they suffer from low capacity and poor performance for high-resolution images. The Ψ-MAP algorithms by contrast use mutual recursion to form global associations with processing elements that have only local connections.

Cellular neural networks, which only have local connectivity, have also been used to create (classification-type) associative memories. However, these associations are also defined as the correspondence between the beginning and ending points of a path in a dynamical system and do not contain static relationships corresponding to explicit associations between two mutually recurrent state variables.

In contrast to many neural networks that use binary data values, the inventive model uses real values. Moreover, the inputs and outputs are real-valued data defined on a continuum rather than on a discrete set of points.

Neural field models have been studied for over 50 years. This approach models the behavior of a large number of neurons by taking the continuum limit of discrete neural networks where the continuous state variables are a function in space representing the mean firing rates. The primary distinction between the prior art models and the model of the present invention is the physical quantity being measured. Neural field models attempt to describe the mean neuron firing rates as continuous quantity, while the Ψ-MAP array model describes the concentration of neurotransmitters in the extracellular space as a continuous quantity. The localization of neurotransmitters to the space within the synaptic cleft is an evolutionary optimization. In contrast with the neural field models, individual neurons in the Ψ-MAP array model correspond to points sampled from the space on functions defined over the concentration of neurotransmitters in physical space. Since neurons are samples from this infinite-dimensional space of functions, but are physically located in three-dimensional space, their output values will appear discontinuous.

The manifold backpropagation algorithm (Puechmorel, Ibnkahla & Castianié, 1994) generalizes the vector backpropagation algorithm for neural networks (Ibnkahla, Puechmorel & Castanié, 1994) which is itself a generalization of the common PDP backpropagation method. However, all of these algorithms take as inputs a finite set of points and are therefore discrete. In the case of the multi-layer manifold neural network, the inputs, hidden layers and outputs are a finite set of points located on a manifold. Each point has a matrix of adjustable weights representing a linear transformation in the tangent bundle. This contrasts with the Ψ-MAP model where the data is continuous, in particular a function representing the concentration of neurotransmitter present in the extracellular space. Furthermore, the weights are not a finite set of matrix coefficients but rather functions or measures defined in three-dimensional space.

Neural networks are functions that map input vectors to output vectors based on the values of a collection of real-valued weights. The manifold that results from viewing these functions as a space parameterized by the weights is sometimes called a neural manifold (Amari, 1997; Santiago, 2005). For purposes of the present invention, we extend this term to the case where the number of weights is infinite, that is, the weights represent a function describing the sensitivity of the dendritic tree or the output of the axonal tree in three-dimensional space.

Under reasonable assumptions about noise, functions defined on higher dimensional spaces are capable of encoding more information that those defined on lower dimensional spaces. Consequently, dimensional reduction techniques result in an irretrievable loss of information. These techniques are inherent in the concept that the CNS has developed some type of feature extraction mechanism that converts functions defined on continua into tokens.

In the Ψ-MAP algorithms, there is no need to extract features or remove the image's intrinsic topological structure, which is preserved during the spectral transformations. The associations take place directly between the input image pixels and output image pixels. Consequently, there is no intervening space of lower dimension that forces a loss of information. In contrast, indirect methods reduce image data to an intermediate form by finding discrete tokens or lower dimensional features such as edges and corners. These methods form associations by analyzing features in the lower dimensional space.

Except for the initial low-level processing stages, many computer vision algorithms are primarily concerned with segmentation, feature extraction, feature detection, and high-level processing. These are indirect methods that require the reduction of multi-dimensional image data to a lower dimensional space. The direct method of the present invention also contrasts in this regard from previous work on self-organizing maps, competitive learning and the reduction of topographic maps to discrete vectors.

An "isomorphism" is a one-to-one mapping between two sets where the mapping preserves analogous operations within each set. The Ψ-MAP design uses isomorphisms between functions and their spectral representations in order to determine associations faster and more accurately.

Wavelet networks combine the functional decomposition of wavelets with the parameter estimation and learning capacity of neural networks (Zhang & Benveniste, 1992; Iyengar, Cho, & Phoha, 2002). These algorithms learn the wavelet coefficients and the parameters associated with scale and position by minimizing an error term. Wavenets leave the scale and position parameters fixed, and learn only the wavelet coefficients (Thuillard, 2002). These models are well suited for function learning and the approximation of arbitrary functions defined on $\mathbb{R}^n$ (Rao & Kumthekar, 1994; Zhang, Walter, Miao & Lee, 1995; Ciuca & Ware, 1997). The inclusion of a linear term reduces the number of wavelets required (Galvão, Becerra, Calado & Silva, 2004). The estimated coefficients, which are the outputs of a wavelet network, can be used as inputs to a traditional neural network and used for classification and system identification (Szu, Telfer & Garcia, 1996; Deqiang, Zelin & Shabai, 2004).

There are several major differences between wavelet networks and the inventive model. First, the objectives are different: while wavelet networks attempt to find wavelet coefficients that approximate a function, the Ψ-MAP algorithms attempt to create an associative memory between functions by mapping the wavelet coefficients of the input image to the wavelet coefficients of the output image.

Second, wavelet networks are defined in terms of a set of functions that form a wavelet basis, while the methods described herein are defined in terms of the continuous wavelet transform (CWT) or a wavelet frame that contains redundant information. This permits the creation of associations with fewer non-zero coefficients, and allows the use of the reproducing kernel to reduce noise and create stability in the recursive connections.

Since distinct pairs of functions in a wavelet basis are by definition orthogonal, the value of the reproducing kernel will be zero at points corresponding to the pair. Consequently, a projection based on the reproducing kernel will have no effect, since any possible combination of coefficient values corresponds to a valid image. As a result, when using a wavelet basis, the redundancy present in a CWT or a wavelet frame representation cannot be used to reduce error and create stable minima. The linear dependence of the functions allows the use of the reproducing kernel provided there is sufficient redundancy.

Many neural models are stochastic and involve one or more random variables. These often take the form of a hidden Markov model. While any analog or continuous computation involves some amount of noise, the actual behavior of individual neurons does not appear to be random. The fact that neighboring neurons usually exhibit completely different response patterns is sometimes seen as evidence of an underlying stochastic mechanism. However, as we will show, the spatial discontinuity in neuron firing rates is the result of sparsely sampling an infinite-dimensional space of functions.

In contrast with these methods, the Ψ-MAP model is entirely deterministic. That is, given the same inputs it will predictably produce the same outputs.

In general, we will use lowercase letters for functions and variables and uppercase letters for manifolds. Bold lowercase letters denote vector variables while bold uppercase letters denote vector spaces.

Script letters (e.g., F) designate transforms that map functions defined in one space to functions defined in another space. Brackets "[ ]" are used along with parentheses to specify the transformation of a function as well as its arguments. For example the Fourier transform of a function g(x) will be denoted by $F[g](\omega)$ where the argument $\omega$ is the radial frequency.

We will use the term "measure" to mean a signed measure, that is one that can map sets to negative values (Kolmogorov & Fomin, 1970). An integral using a signed measure can be regarded as a shorthand notation for an integral that is evaluated as the difference of two integrals using ordinary, nonnegative measures.

The standard notation $L^p(H,\mu)$ refers to the space of functions on H where the integration is done with respect to the measure $\mu$ (Royden, 1988; Taylor & Lay, 1980). Functions actually refer to equivalence classes and consequently, two functions are equal when they are equal almost everywhere, that is, except on a set of measure zero. For simplicity, we will usually drop the explicit specification of the measure and denote the function spaces as $L^2(H)$ even when it is possible to generalize the results to $L^p(H)$ for $p \neq 2$. To make it easier to identify functions and spaces, we often use the same letter in both lowercase and uppercase to denote a function and the space on which it is defined, for example $h \in L^2(H)$.

In the world of everyday experience, humans regard symbols as graphical icons (Jung, 1964), visual representations that can be photographed and printed on a sheet of paper. Computers on the other hand regard symbols as the bit patterns contained in a single byte or word. When required, the glyph or a textual description of these efficient bit representations is available from a table of character codes or a dictionary. Physically and mathematically, these two types of symbol representations are fundamentally irreconcilable. A photograph records a scalar or vector valued function defined on a rectangular region of space, that is, a two-dimension manifold, while a bit pattern identifies a single element in a finite set of discrete points. One of the most salient characteristics of the $\Psi$-MAP algorithms is their ability to learn and execute general-purpose operations on high-resolution images, without ever having to reduce these symbols to a bit pattern that fits into a single word of computer memory.

Just as a SR flip-flop is composed of two stateless NAND gates, each $\Psi$-MAP is composed of two stateless $\Lambda$-MAPs. These are labeled the external and internal $\Lambda$-MAPs analogous to the external and internal lamina of the neocortex. In a steady-state condition, the outputs of these two $\Lambda$-MAPs form a reciprocal image pair.

The cerebral cortex is composed of approximately fifty Brodmann areas. The outputs of each Brodmann area, which arise primarily from the external and internal pyramidal layers, project to the inputs to one or more other Brodmann areas. Each Brodmann area is analogous to a single $\Psi$-MAP, and we refer to an analogous collection of interconnected $\Psi$-MAPs as a $\Psi$-MAP Array.

Image masks, presumably originating from the thalamus, control the operation of the array by specifying whether the individual $\Psi$-MAPs should accept new inputs or retain their current contents. By overlaying the content images, they can also focus attention onto specific regions of interest.

While neural field models attempt to describe the mean firing rate of neurons as a continuum, we instead model the concentration of neurotransmitters in the extracellular space as a continuum. Modeling the density of various chemical substances in space is straightforward and commonplace. While neurotransmitters are generally confined to the small gap in the synaptic cleft, this can be seen as an evolutionary adaptation to the problems of inertia and diffusion that would result if large quantities of neurotransmitters were present throughout the entire extracellular space. We describe a model where the release of neurotransmitters by the axonal tree and the sensitivity of the dendritic tree, are both characterized by functions on the two-dimensional cellular surfaces embedded in three-dimensional space. In this model, information is not encoded in the neuron firing rates, but rather in the neurotransmitter concentrations.

Topologically, a network is a type of graph, described by graph theory and the laws of discrete mathematics. Consequently, the intrinsic characteristics of a neural network are discrete. In order to move from the discrete to the continuous, we need to generalize the discrete concepts of neural networks to continuous concepts of computations defined on manifolds. In effect, we need to replace summations with integrals. Discrete and continuous analogs are common in science and engineering. For example, the continuous Fourier transform and the discrete FFT, or the continuous and discrete wavelet transforms. Some transforms, such as the Z transform are continuous in one domain and discrete in another. We refer to the continuous generalization of a discrete neural network as a neural manifold (NM).

The standard projection neural network calculates the inner-product summation of its input nodes with a vector of fixed weights. Since the operations in a neural manifold are defined using Lebesgue integrals, the operands can contain Dirac delta (impulse) functions. We will show how this mathematical formulation allows the neural manifold to subsume completely the functionality of the standard neural network. That is, for every projection neural network there is a corresponding neural manifold analog that performs an identical calculation. Furthermore, the Lebesgue integral allows us to mix together any combination of discrete and continuous data. We demonstrate how a realistic physical structure representing an actual neuron naturally leads to a neural manifold model.

While the recursion allows neurons with local connections to form global associations, a mixture of region sizes from which the neurons make connections allows a $\Psi$-MAP to find the matching image more readily. We can extend this idea by "pre-computing" the average of small image regions with various sizes and using these averages as inputs to the neurons. Rather than simply using averages, we further extend this idea by using local spectral functions such as two-dimensional wavelets. These spectral functions can be identical to the well-known receptive fields in the retina of the eye. A topographic mapping, from the size of the receptive field in the retina, to the location within the thickness of a single lamina in Brodmann area 17, the primary visual cortex, is well documented. In the section on spectral transforms, we discuss how rather than being an unusual anomaly, that is unique to the visual system, the receptive fields of the retina are an expression of a general principal of operation that governs all of the $\Psi$-MAPs throughout the cortex.

Many spectral operators such as the wavelet transform, map functions from a lower dimensional space to a higher dimensional space. The result is that an arbitrary function in the higher dimensional space does not necessarily correspond to a function in the lower dimensional space, and consequently its inverse transform does not exist. The reproducing kernel allows us to define an integral operator, which is linear and orthogonal and maps an arbitrary function in the higher dimensional space to the nearest function for which the inverse transform exists. Performing this projection at the final stage in both $\Lambda$-MAPs, reduces various computational errors and guarantees that the $\Psi$-MAP outputs always represent valid images.

Wavelet transforms and neural manifolds provide a framework in which we can specify a detailed $\Psi$-MAP design. For the purposes of explanation and analysis, we describe a single reference prototype. However, there are many possible variations to this design that arise from numerous implementation tradeoffs and alternate design patterns. The first of these is a choice between synchronous and asynchronous architectures and we argue that while an asynchronous design is possible, it may be problematic. If the synchronous alternative is chosen, we can replace the standard square wave clock used in digital circuit design, with a triangular wave analog clock. Using the clock phase information, it is possible to implement progressive resolution algorithms that begin with high-frequency details and progressively incorporate lower-frequency spectral information.

The primary outputs of the neocortex arise from the two pyramidal layers. Since these outputs must travel a relatively long distance, in order to conserve metabolic energy, teleonomic arguments suggest the need for accurate encoding algorithms that can represent images with a very few number of neurons. We describe a nonlinear encoding method that achieves this goal and is consistent with the known lateral inhibition in the pyramidal cells.

With the understanding that many architectural design variations are possible, we describe a detailed reference Ψ-MAP prototype and the mathematics that govern it. We deconstruct and analyze the Ψ-MAP and describe each of the constituent components, including the integration of multiple input images, the general association neural manifolds, the masking and multiplexing operations and the orthogonal projections.

For many neural networks, learning is a simple matter of associating outputs with inputs. However, because of the additional complexity of the Ψ-MAP several different types of learning are possible. We identify six distinct learning categories and briefly characterize each one.

The veracity of a scientific model is ultimately judged by how well it predicts real world phenomena. The Ψ-MAP Array model has many features in common with known facts about the neocortex. In the section on neurological and psychological correlates, we present a series of very brief connections or links between established neuroscientific facts and characteristics of the Ψ-MAP Array model. Many of these deserve detailed study in their own right and the few sentences provided serve only to identify the connection.

We can interpret an arbitrary collection of photographs as a set of symbols. If we wish to represent numbers or letters, we can pick a font and record images of their alphanumeric glyph. Similarly, fixed-time snapshots of any two-dimensional computational map may represent symbols of external stimuli or motor control actions. Words can be represented by recording their acoustical sound and storing two-dimensional time/frequency spectrographs.

If a folder on a workstation contains a number of digital photographic images, it is easy to imagine a black box that takes as input, a character string (the filename) and produces the associated photograph as an output. Abstractly this simple program is an associative memory device that associates a string address and a photographic image. Moreover, the association is arbitrary in that we can choose any filename we want for any image. Now instead of a string address assume that we use an image as an address. This new black box takes a photograph as its input address and associates with it an arbitrary output photograph. This abstract black box represents a two-dimensional manifold association processor (2D MAP)

The black box described above took as an address a single input image, and produced as a result a single output image. However, a MAP can take as input any number of image addresses and produce as output any number of image results. Illustrated in FIG. 1, we show a two-input, single-output 2D MAP. The output of a multi-input MAP depends on all of its inputs. That is, the output image may change when any of the input images changes. This abstract MAP model is stateless. It does not remember past values, and its output image depends only on the current values of its input images. We will refer to a stateless, single-output Manifold Association Processor as a Λ-MAP (Λ from the Greek word Logikos).

If images can represent symbols, then a two-input, single-output Λ-MAP can function as an Arithmetic Logic Unit (ALU). Imagine ten photographic images of the digits zero through nine. By learning two hundred image associations, the Λ-MAP can memorize the addition and multiplication tables. If two images are used to represent "Condition X is True/False", then any binary Boolean operation can be learned by memorizing four image associations. Thus, a Λ-MAP is logically complete and consequently, with additional memory and control components, it can simulate the operation of any digital computer.

The abstract Logic Manifold Association Processor or Λ-MAP of FIG. 1 produces an output image that is associated with its input images. It is stateless since its current output does not depend on the previous inputs.

A modern digital computer typically contains both dynamic and static Random Access Memory (RAM). Static RAM or SRAM does not need to be refreshed and will maintain its state as long as power is supplied. Internally, inside each bit of SRAM, is a logic circuit equivalent to the inverter loop shown in FIG. 2a. This circuit contains two inverters, each of which generates an output that is the logical complement of its input. This circuit has only two stable states, one where the value of Q equals one and its compliment Q' is zero, and the other where Q equals zero and Q' is one. Other combinations of values for Q/Q' are unstable. If the circuit is ever momentarily forced into a state where Q and Q' are both equal and then released, it will oscillate for a few nanoseconds before it settles into one of the two stable states.

Figure 2A:
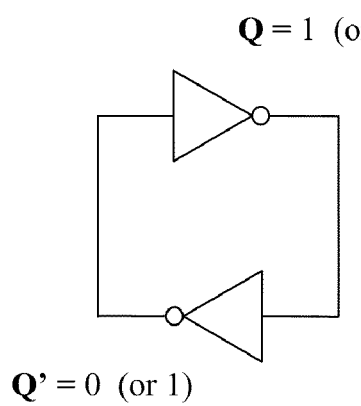
FIGS. 2a and 2b illustrates a logic circuitry of a fundamental unit of memory where
Figure 2B:
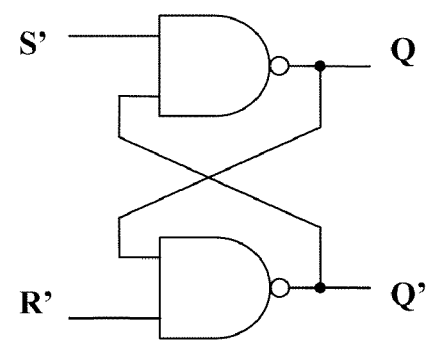

FIG. 2b shows the logic diagram of a standard S-R flip-flop designed using two NAND gates. When the "set" (S') and "reset" (R') inputs are both one, the circuit is equivalent to the inverter ring shown in FIG. 2a and will maintain its value indefinitely. If the S' or R' inputs momentarily go to zero the flip-flop will set (Q=1) or reset (Q=0) and remain there until either the S' or R' input is changed again.

FIGS. 2a and 2b illustrate the fundamental unit of memory, a single bit of storage, that can be constructed from two logic gates by creating a circuit with a feedback loop. FIG. 2a illustrates two inverters in a ring "lock in place" a single bit and its complement. FIG. 2b shows that when the set (S') and reset (R') inputs are both one, the SR flip-flop is logically equivalent to the inverter ring. A zero applied to either the S' or R' inputs can be used to change the state of the stored bit.

Now suppose we replace the single bits S', R', Q and Q' in the S-R flip-flop with two-dimensional images and we replace the two NAND gates with two Λ-MAPs. This Set-Reset Manifold Association Processor (SR-MAP) is shown in FIG. 3, where we have relabeled the Q' output as P.

Figure 3:
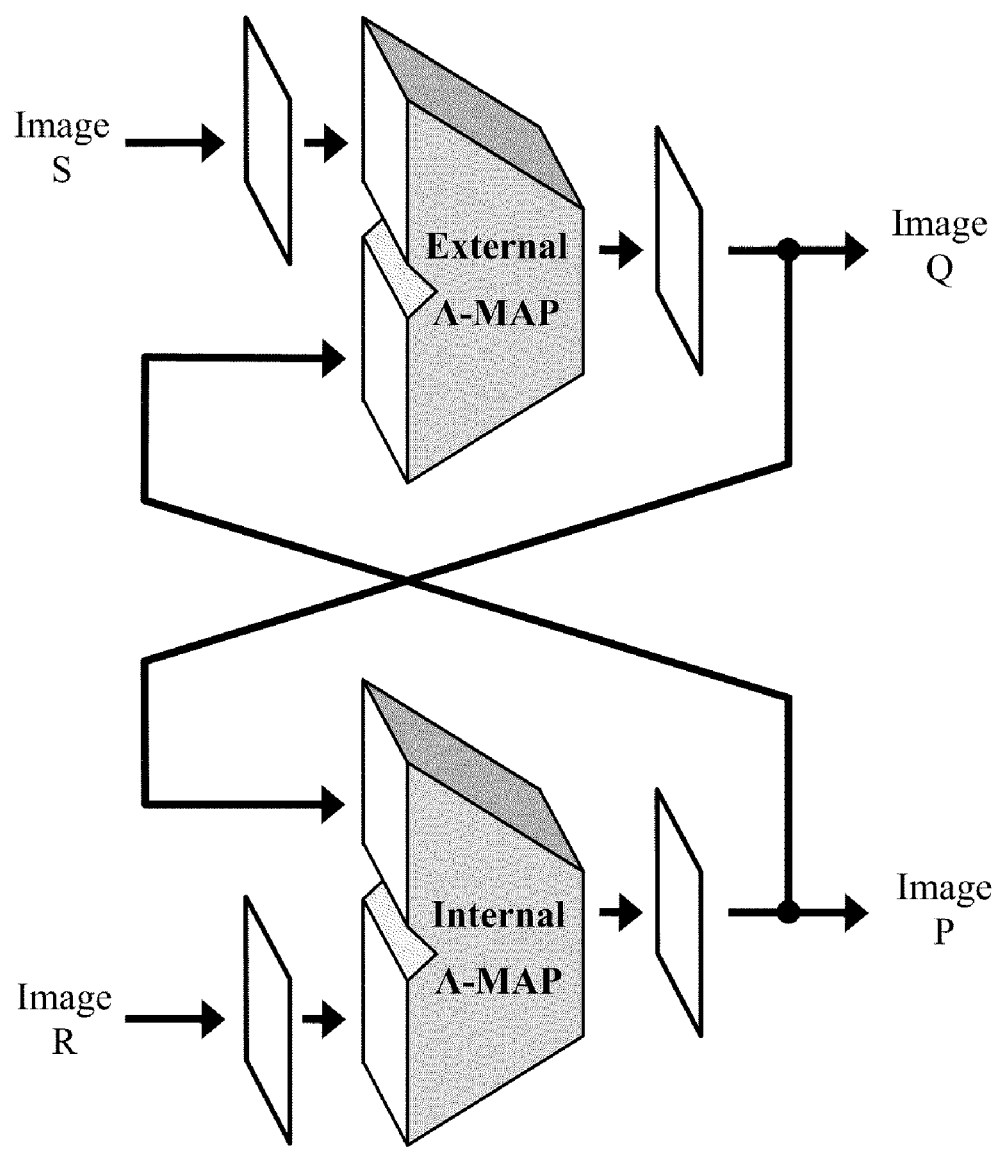
FIG. 3 is a flow diagram of a Set-Reset Manifold Association Processor.

Referring to FIG. 3, let $\Lambda_E(S, P)=Q$ denote the external Λ-MAP in the figure and let $\Lambda_I(Q, R)=P$ denote the internal Λ-MAP. Let Null denote a predefined "blank" image that is identically equal to zero and let $\{(a_1, b_1), (a_2, b_2) \ldots (a_i, b_i) \ldots (a_n, b_n)\}$ be an arbitrary collection of n image pairs. Suppose we program $\Lambda_E$ such that $\Lambda_E(\text{Null}, b_i)=a_i$ and program $\Lambda_I$ such that $\Lambda_I(a_i, \text{Null})=b_i$ for all i. Then when the R and S inputs are Null, the SR-MAP will have n stable states corresponding to the n image pairs $(a_i, b_i)$. Consequently, we refer to the images that form an image pair $(a_i, b_i)$ as reciprocal images.

In addition to the above, suppose we have n input images $(s_1, s_2, s_3 \ldots s_n)$ and we add the additional associations to $\Lambda_E$ such that $\Lambda_E(s_i, X)=a_i$ for any image X. Then by changing the S input from Null to we can force the SR-MAP from whatever state it is currently in to the state identified by the image pair $(a_i, b_i)$. If the S input now returns to Null, the SR-MAP will remain in this state until either the S or R input image changes again.

Illustrated in FIG. 3, the Set-Reset Manifold Association Processor or SR-MAP is analogous to the SR flip-flop. It comprises two Λ-MAPs labeled External and Internal. When $Q=a_i$ and $P=b_i$ these two reciprocal images can "lock" each other in place until changed by the S or R inputs.

Until now, we have been able to operate abstractly on manifolds as smooth continuous functions. In practice, these functions are discretized, either on a regular grid such as the pixels in a digital camera or an irregular grid such as the rods and cones in the retina of the eye. We would like to construct the MAPs using neural networks. However, when every pixel in the input image is part of the calculation for each neural network output pixel, for high-resolution images the number of inputs to the neural net becomes overwhelming and performance begins to degrade. The same is true when the neural network training set contains too many input/output pairs. Consequently, to construct a MAP with a large number of high-resolution associations, a new type of design is required.

Figure 4:
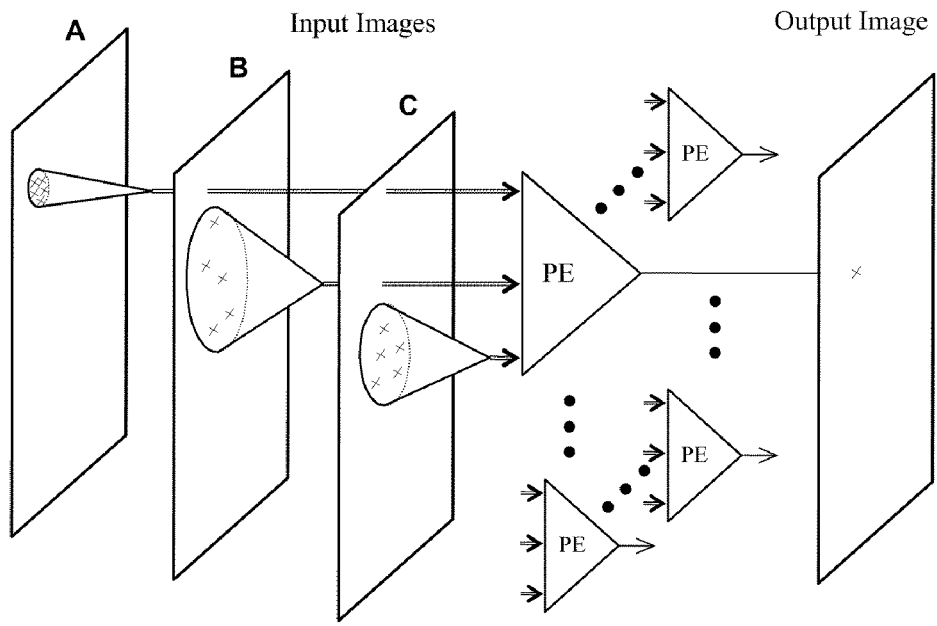
FIG. 4 illustrates processing elements taking pixels from input images producing an output image.

FIG. 4 illustrates how Processing Elements with local support take their real-valued inputs from small regions in multiple input images and produce a single real-valued output corresponding to a single pixel. The region of support may be narrow as shown for image A or broad as shown for image B. A lattice of PEs operating in parallel is used to generate the entire output image.

For the purpose of analysis, we partition the overall neural network and define an abstract Processing Element (PE). Each PE(i,j) accepts a small set (vector) of real-valued inputs and produces a single real-valued output corresponding to the pixel (i,j) in the output image. We will use the term lattice to describe a collection of PEs which form an entire output image. Each PE(i,j) has in, input connections where $m_{i,j}$ is much smaller than the total number of pixels in an input image. Such a network partition is illustrated in FIG. 4. Note that when an image is sampled at a particular location, we assume that derivatives of any order desired are also available at that location.

The particular set of $m_{i,j}$ inputs chosen could be based on a two-dimensional Density Function (DF) similar to a 2D probability density function (Gnedenko, 1968; DeGroot and Schervish, 2001). Pixels in the input image where the DF is relatively larger are more likely to be chosen as inputs to a particular PE. Borrowing from the terminology of real analysis, we define the support of a PE to be those points in the image where the DF is non-zero. If the support of a PE is contained in a region of radius d, where d is small relative to the size of the image, then we say the PE has local support.

We assume that the DF for each PE(i,j) shifts with the relative position (i,j) so that the spatial relationship between the output pixel and the input DF remains approximately the same. Consequently, neighboring PEs would have overlapping regions of support. Note however that the design does not restrict the shape of the DF. FIG. 4 shows a PE with inputs taken from three images but each having different DFs. Even though the number of input samples taken from each image is the same, one support region is relatively "narrow", taking samples that are in close physical proximity, while another region is "broad", taking samples that are sparsely distributed over a larger area. In general, the DFs need not be symmetric, or even centered around the location of the output pixel.

For a direct implementation of a Λ-MAP, the simple design strategy described above and illustrated in FIG. 4 will not work; the output image will consist of a melee of uncoordinated PE results. We need an architecture that will integrate the results of the individual PEs into a coherent whole.

Figure 5:
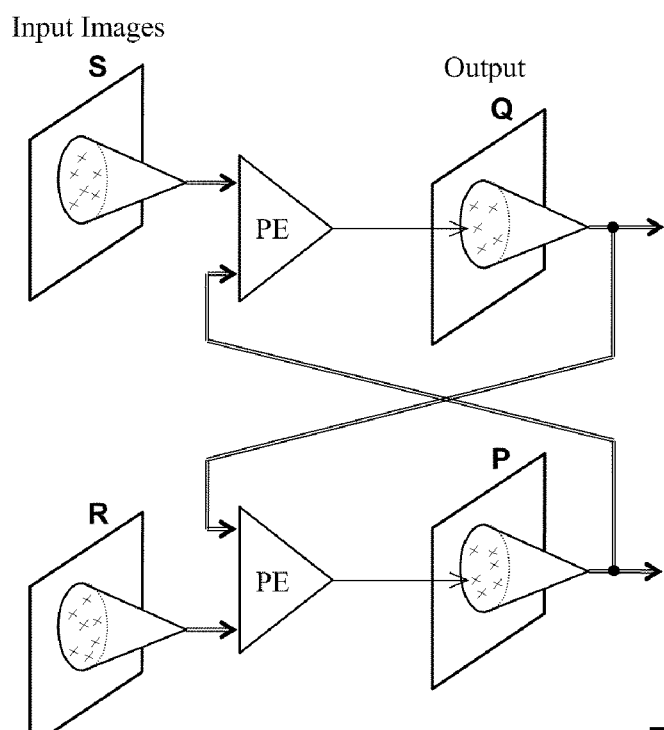
FIG. 5 is a diagrammatic view of a feedback loop in the Set-Reset Manifold Association Processor.

It is impossible to construct a simple feed-forward implementation of a Λ-MAP using neural networks with local support because there is no way to coordinate the individual PE outputs to form a consistent global image association. It is however possible to construct an SR-MAP. This is because the two Λ-MAPs, which make up the SR-MAP, form an image loop. The output of any given PE feeds into the local support of several PEs in the opposite Λ-MAP. These in turn may form many local loops that feed back into the original PE. FIG. 5 illustrates how this can occur by showing two connected PEs in the two Λ-MAPs.

We use the term Ψ-MAP (Ψ from the Greek word Psyche) to refer to a Set-Reset Manifold Association Processor that is constructed from PEs with local support.

The overall behavior of the Ψ-MAP is an emergent property of the internal algorithms used in the PEs and how their DFs overlap and interact. If the PEs are not carefully designed, then the association processor as a whole will operate poorly or not at all. A primary concern is the stability of the Ψ-MAP. Take as an example the SR-MAP described above that has been trained to remember a collection of reciprocal image pairs $(a_i, b_i)$. If an input $s_i$ forces the output of the external Λ-MAP to image which in turn forces the internal Λ-MAP output to $b_i$, then when the S input returns to the null image, the Ψ-MAP must remain locked in the $(a_i, b_i)$ state. If the manifold processor is unstable, then even a small error in one of the output images may cause the outputs to drift away from the correct state. It is therefore imperative that reciprocal image pairs correspond to local minima in the overall Ψ-MAP energy function causing outputs to move toward stored recollections rather than away from them.

Illustrated in FIG. 1, the Ψ-MAP uses the image feedback loop in the SR-MAP to construct global associations from local connections. A single recurrence relation between two processing elements is illustrated where the output of each PE forms part of the other's input.

It is possible that a Ψ-MAP could oscillate for extended periods while searching for a solution. Even when forming a clear recollection, some amount of oscillation may occur as part of the normal association process. It is also possible that the manifold processor may settle into false local minima where the output images represent "montages" comprising parts of several indistinct associations. These false local minima may be perceived as faint or "hazy" memories.

Because of the lamina of the neocortex, the previous discussion focused on the association of images, that is, functions defined on two-dimensional manifolds. However, nothing limits us to two dimensions. The extension of the Λ-MAP, SR-MAP and Ψ-MAP concepts to n dimensions is simple and straightforward. In particular, the recognition of three-dimensional objects is critical to survival and it seems probable that the CNS uses a 3D-MAP for this purpose rather than rely on two-dimensional projections. Additionally, one-dimensional Ψ-MAPs can analyze functions defined in time or frequency.

It is tempting to try to create a zero-dimensional Ψ-MAP based on an arbitrary collection of symbols or words. The problem with this is the lack of a suitable metric. The ISO Latin character set is mapped to the integers 0-255 which inherit a metric from the reals ($\|x-y\|$) but fractional values are meaningless and synonyms are not defined by close proximity in a dictionary. Consequently, it is difficult or impossible to establish a meaningful notion of convergence. In the Ψ-MAP Array model, synonyms are also not similar to each other phonetically, but their spectrograms are associated directly or indirectly with other images which are close to each other in terms of a quantifiable metric.

Figure 6:
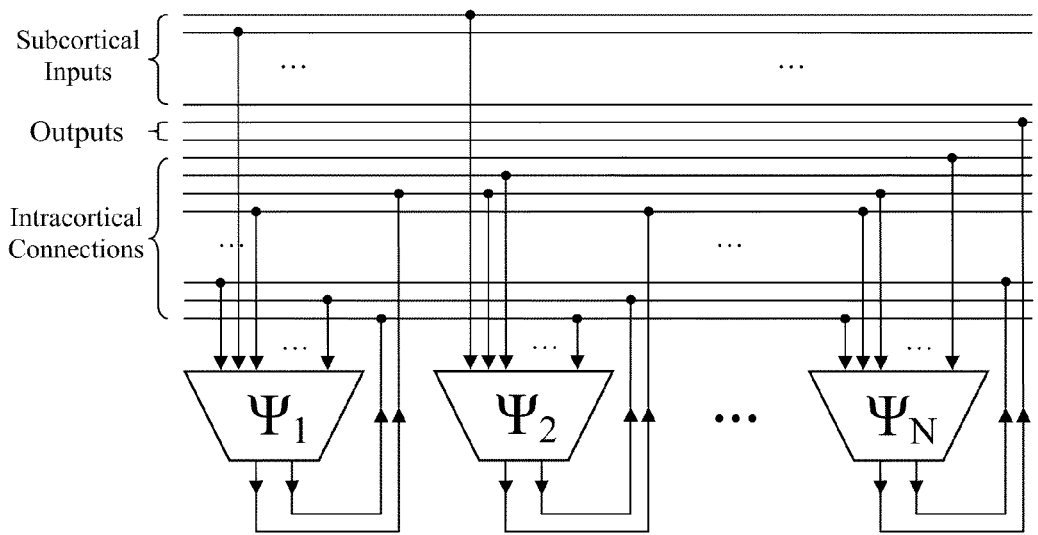
FIG. 6 is a schematic view of the Set-Reset Manifold Association Processor Array model.

If we assume that each Brodmann area in the neocortex corresponds to a unique Ψ-MAP, then the collection of all the Brodmann areas constitutes a Ψ-MAP Array as shown in FIG. 6.

Each line in the FIG. 6 corresponds to a two-dimensional image. To simplify the diagram, we use an Input/Output bus ("I/O Bus") notation where the horizontal rows along the top of the diagram represent images, and the dots represent connections. The array transmits sensory inputs and motor control outputs as two-dimensional computational maps. Figuratively via the I/O bus, each Ψ-MAP generates and sends two output images corresponding to its two Λ-MAPs. However, a Ψ-MAP can have any number of input images. This is illustrated in FIG. 4 where we showed how a neural network with local support could accept inputs from three separate images. Using topographic alignment, each Ψ-MAP can integrate together any number of images from the I/O bus.

In the Ψ-MAP Array model of the neocortex as illustrated in FIG. 6, each Ψ-MAP, $\Psi_i$, corresponds to a separate Brodmann Area. Lines in the diagram correspond to 2D images, and dots represent specific input and output connections.

Inside every CPU (Central Processing Unit), a control unit coordinates the flow of data between the various components. As an extreme example, one possible control structure for the Ψ-MAP Array would be to have all of the Ψ-MAPs always transmitting their outputs and continually receiving and processing entire images from all of their inputs. However, a more dynamic and flexible design would allow some of the Ψ-MAPs to be active while others remain inactive or quiescent. The inputs received from the quiescent MAPs may correspond to "off" or null images. While a particular Ψ-MAP may have many inputs, only a subset (including the empty set) may be active at any given time. The MAPs may also choose to retain their contents or selectively accept new inputs.

Every area of the neocortex has reciprocal connections with the thalamus, which is known to play an important role in consciousness. Based on observed behavior and the types of real-world problems that the CNS must solve, an agile and flexible control mechanism must be able to focus on subsets or regions. We can view these manifold regions as 2D "control masks" that overlay Ψ-MAP images and regulate the Ψ-MAP processing and I/O. Based on the current images and newly formed associations, each Ψ-MAP in the neocortex relays an "activity" mask to the thalamus. The thalamus in turn relays a "process/hold" control mask back to the Ψ-MAP. The masks blanket the entire extent of the Ψ-MAP Array "content" images, and consequently they can identify an arbitrary region within the image. The portions of the MAP images inside the masked region are active while those outside of the region are quiescent. In this way, the thalamus can focus attention on the entire image or on some very small detail. Given the variety of computational maps, control masks can direct our attention to a small region in the visual field, a single sound in a word, a particular part of the body surface, or the motion of a single muscle. Using time varying control masks, we can spatially scan a visual image, or temporally scan through the sounds of a sentence recorded in a spectrogram.

The incorporation of masks into the control structure of the Ψ-MAP array significantly extends its functional capacity. With control masks, in addition to the numerous image combinations, we can also create associations based on various selected parts of the content images. Thus, the control masks direct how and when the associations are formed.

Figure 7:
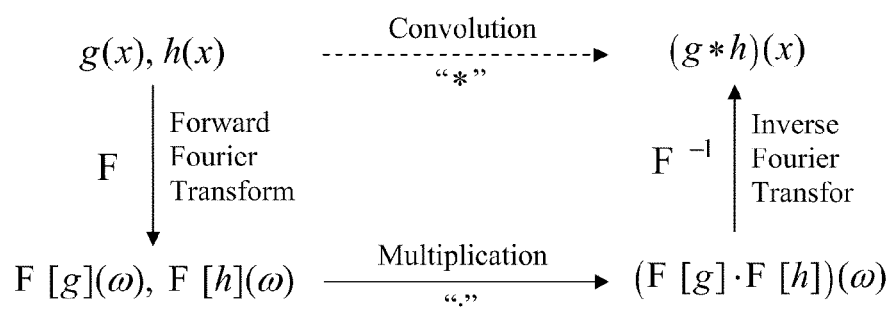
FIG. 7 provides an isomorphic mapping of functions.

FIG. 7 illustrates how the Fourier transform maps functions of the real variable x to the spectral space of functions of the frequency variable ω. The two spaces are isomorphic under the convolution and multiplication operators. An isomorphism is a one-to-one mapping between two sets, where the result of an operation on elements of one set, maps to the result of a second operation performed on the mapped elements.

It often happens that operations that are difficult to perform in one space can be transformed to another space where the computation is easier. An example of this is illustrated in FIG. 7 where the convolution of two functions $f$ and $g$ is computed by taking their Fourier Transforms, multiplying the results and then taking the inverse Fourier Transform. Since the Fast Fourier Transform (FFT) can be computed in time $O(n \log n)$ and a convolution requires time $O(n^2)$, for large n the indirect approach using forward and inverse FFTs is quicker. Other transform methods including the cosine transform, the Walsh transform, or the wavelet transform can also be used to establish isomorphic mappings between function spaces.

We will explore a similar isomorphism between the space of images and their spectral representations. However, instead of convolution and multiplication, the operation in both spaces will be the establishment of an association relationship between two arbitrary functions.

Axons from the on and off-center ganglion cells in the retina form the optic nerve. These cells receive inputs from nearby photosensitive rods or cones in a roughly circular receptive field that contains both a center area and a surrounding ring. For the on-center ganglion cells, the maximum excitation is achieved when the center region is illuminated and the surrounding ring is dark, while just the opposite is true for an off-center ganglion cell. Different ganglion cells have receptive fields that vary in size; the M (for magni, or large) cells have receptive fields that cover a wide area while the P (for parvi, or small) cells have relatively narrow receptive fields. It has been noted (Kelly 1975; Nevatia, 1982; Horn & Brooks, 1989) that these receptive fields are similar to spherically symmetric functions where the difference in the size receptive fields of the M and P cells is given by the scaling parameter s.

The axons of the P and M ganglion cells remain segregated as they project onto the lateral geniculate nucleus (LGN). The ventral layers of the LGN, known as the magnocellular layers receive their inputs mainly from the M ganglion cells while the dorsal parvocellular layers receive inputs mainly from the P ganglion cells. Moreover, as the neurons in the LGN project to the primary visual cortex (Brodmann area 17), they maintain this separation. Indirectly though the LGN, the majority of the M ganglion cells in the retina, map to layer 4Cα in the cortex, while the P ganglion cells map to layer 4Cβ directly beneath it. This implies that if we establish a local (x,y,z) coordinate system in the primary visual cortex with the xy-plane parallel to the layers of the cortex and the z-axis perpendicular to the surface, the size or scale of the receptive field will be topographically mapped to the z dimension.

Throughout the cerebral cortex, the grey matter is plainly visible on a macroscopic scale. That is, the layers which make up the cortex have a multi-cellular thickness in the perpendicular z direction that gives the layers a three dimensional structure. A central thesis behind the inventive method is that the topographic mapping of receptive fields of increasing size map to the third (z) dimension is not an anomaly unique to visual processing, but rather, is a general principle that underlies all computations in the cerebral cortex.

Like the Fourier transform, the wavelet transform maps functions to an isomorphic frequency space where some computations can be performed more accurately with fewer operations. However, unlike the complex exponential function exp(iωx) in the Fourier transform, which stretches to plus and minus infinity, wavelets are concentrated at a particular point in time or space. Moreover, there is not one single, unique set of wavelets, but an infinite number of wavelet sets that are defined only in terms of a few general characteristics. In one-dimension, a single main wavelet φ, which is normalized and symmetric about the origin, can generate a family of wavelets at position x and scale s (Mallat, 1999)

$$\varphi_{x,s}(\xi) = \frac{1}{\sqrt{s}} \varphi\left(\frac{\xi - x}{s}\right) \quad (1)$$

We will refer to wavelets with a relatively large value of scaling parameter $s \in R_+$ as low-frequency wavelets and those with a relatively small value of s as high-frequency wavelets. The wavelet transform $\tilde{f}$ of a function $f$ is given by $$\tilde{f}(x, s) = W[f](x, s) \quad (2)$$
$$= \int_{-\infty}^{+\infty} f(\xi) \varphi_{x,s}^*(\xi) d\xi$$
$$= \langle f, \varphi_{x,s} \rangle$$

where $\phi^*$ denotes the complex conjugate of $\phi$. The inverse wavelet transform completes the isomorphism illustrated in FIG. 7 by providing a transform of the computed results back to the original space.

$$f(\xi) = W^{-1}[\tilde{f}](\xi) \quad (3)$$
$$= \frac{1}{C_\varphi} \int_{-\infty}^{+\infty} \int_{-\infty}^{+\infty} \tilde{f}(x, s) \varphi_{x,s}(\xi) dx \frac{ds}{s^2}$$

The constant $C_\phi$ is given by $$C_\varphi = \int_0^{+\infty} \frac{|\hat{\varphi}(\omega)|^2}{\omega} d\omega \quad (4)$$

where $\hat{\phi}$ is the Fourier transform of $\phi$.

Several methods are available that can generate sets of multidimensional wavelets whose linear combinations are dense in $L^2(R^n)$.

Let the vector $x = (x_1, x_2, \ldots, x_n) \in R^n$ denote the wavelet position, the vector $s = (s_1, s_2, \ldots, s_n) \in R_+^n$ the set of scaling factors, and $\xi = (\xi_1, \xi_2, \ldots, \xi_n) \in R^n$ the dummy variables of integration. A straightforward multidimensional extension of the wavelets specified in (1) is to let m=n and form the separable functions:

$$\varphi_{x,s}(\xi) = \frac{1}{\sqrt{s_1 s_2 \ldots s_n}} \varphi\left(\frac{\xi_1 - x_1}{s_1}\right) \varphi\left(\frac{\xi_2 - x_2}{s_2}\right) \ldots \varphi\left(\frac{\xi_n - x_n}{s_n}\right) \quad (5)$$

The parameter space for these wavelets, $(x,s) \in R^n \times R_+^n$, has dimension 2n, and the wavelets mix information at many different scales, $s_i, s_j$.

Separable multiresolution methods can be used to construct separable wavelets that have the same scale parameters (Mallat, 1999). The resulting multiresolution wavelets have a parameter space, $(x,s) \in R^n \times R_+$, of dimension n+1.

Of particular interest in neurobiology are spherically symmetric wavelets, which can be expressed in the form $\omega(x) = f(\|x\|)$; $x \in R^n$ for some one-dimensional function $f$. The scale parameter for spherically symmetric wavelets is a single real-valued positive number $s \in R_+$. Consequently, the overall parameter space has dimension n+1.

For two-dimensional images, an example of a spherically symmetric wavelet is the Mexican hat wavelet, which is somewhat similar to the receptive fields in the retina. However, because it is the normalized second derivative of a Gaussian function, it has non-zero values out to infinity. This implies that to compute such a wavelet, many of the neuron dendritic trees would need to extend over the entire range of the image, thereby reducing some of the advantages of local support. For this reason, we are mainly interested in wavelets with compact support (Daubechies, 1992), in particular wavelets that are zero outside a small local region.

If a wavelet is spherically symmetric, so is its Fourier transform. Thus, $\hat{\phi}(\omega) = \chi(\|\omega\|)$ for some function $\chi$, and the admissibility condition is $$C_\chi = \int_0^{+\infty} \frac{|\chi(\omega)|^2}{\omega} d\omega < \infty \quad (6)$$

For $f \in L^2(R^n)$ the wavelet transform, $\tilde{f}$, is defined by extending the integration in Equation (2) to n dimensions. The inverse transform in n dimensions (Daubechies, 1992; Addison, 2002) is given by $$f(\xi) = W^{-1}[\tilde{f}](\xi) \quad (7)$$
$$= \frac{1}{C_\chi} \int_{R_+} \int_{R^n} \tilde{f}(x, s) \varphi_{x,s}(\xi) dx \frac{ds}{s^{n+1}}$$

So far, we have discussed wavelets defined on $R^n$. However, the CNS processes many different types of the topological manifolds (Greer, 2003). These include the surface of a sphere, disks, the surface of a cylindrical section, and even kinetic images composed of the union of disjoint muscle cross-sections. The common thread running through these spaces is that they are mathematical manifolds, that is, around each point there is a neighborhood that is diffeomorphic to an open set in $R^n$. We will use M to denote an arbitrary n-dimensional manifold. Wavelets on spherical surfaces are widely used in science and spectral operators on any manifold can be defined using linear integral transforms.

Separable wavelets with multiple asymmetric scaling factors, multiresolution wavelets and spherically symmetric wavelets defined on M all have a scaling parameter space $R_+^m$ where $1 \leq m \leq n$. All of these wavelets are constructed by forming dilated "daughter" wavelets from a single main wavelet. The amount of dilation is specified by the scaling parameter s as in Equation (1) or the $\{s_i\}$ in Equation (5).

While the receptive fields of the retina resemble two-dimensional wavelets, there is evidence to suggest that they are not simply dilated versions of one another. The response characteristics of the larger low-frequency receptive fields have a dissimilar shape and contain a different number of periodic cycles than the smaller high-frequency receptive fields. Therefore, it is impossible to make these spectral functions congruent with each other by a simple dilation. These functions are not dilated versions of a single main wavelet, but they may form a frame (Mallat, 1999). For any position $x \in M$ and scaling vector $s \in R^m$ we can define a set of functions $\{\phi_{x,s}\}$ that have local space and frequency characteristics. We can view these as a generalization of wavelets similar to a windowed Fourier transforms and where the window is allowed to contract and change shape with increasing frequency. While these functions may not be scaled versions of a single main wavelet, they have wavelet-like spectral characteristics and we can match them exactly with the receptive field characteristics of the retina. We let S denote the generalization of the continuous wavelet transform and define it in terms of the inner product of the wavelet-like functions on M.

$$S[f](x, s) = \langle f, \varphi_{x,s} \rangle \qquad (8)$$

$$= \int_M f(\xi) \varphi^*_{x,s}(\xi) d\xi$$

The spectral transform S is qualitatively similar to the wavelet transform W in its ability to provide a range of frequency information at a localized position in space. A question that may arise is how to form an orthonormal basis for such a general set of wavelet like functions. In the following analysis however, a set of basis functions is not required. What is required is a spectral transform that has some of the key properties of the continuous wavelet transform. Since a countable set of functions that form a frame or an orthonormal basis is not necessary, it is important to list what properties are actually required.

For a general spectral transform S, we will assume the following list of properties.

(a) We assume S transforms functions defined on an n-dimensional manifold M, and is defined by Equation (8) for some set of spectral functions $\{\phi_{x,s}(\xi)\}$, where $x \in M$ is the "center" location, and the vector $s \in R^m$ denotes the scaling factors. We will refer to the n+m dimensional parameter space $J = (M \times R^m)$ as a spectral manifold.

(b) We require that a reconstruction formula corresponding to S, exist and be well defined. Let U be the subspace of $L^2(J)$ that corresponds to transforms S[f] or some set of functions. For $\tilde{f} \in U$ we denote the inverse transform as $S^{-1}[\tilde{f}]$ and require that $f = S^{-1}[S[f]]$ almost everywhere.

(c) For continuous wavelet transforms, the reproducing kernel described below can be derived from the reconstruction formula. For the case of a general spectral transform, we require that an equivalent reproducing kernel exist, and that it can be used as a kernel for a linear orthogonal projection onto U.

The extension to the Ψ-MAP computational model can be defined on any n-dimensional manifold M with functions $\{\phi_{x,s}\}$ forming an n+m dimensional spectral manifold J. The functions $\{\phi_{x,s}\}$ could be separable wavelets (with m=n), multiresolution wavelets, spherically symmetric wavelets (with m=1), other types of wavelets, or a general set of spectral functions that are not wavelets at all, but satisfy the three postulates listed above.

Each of the Brodmann areas $\{\Psi_i\}$ has a unique flat shape that projects along the direction of the cortical columns onto a two-dimensional manifold $M_i$. We hypothesize that in addition to the retinal projections onto the primary visual area in the neocortex, the other Brodmann areas also use spectral functions that resemble spherically symmetric wavelets defined on two-dimension images. The spectral functions are parameterized by a center position $(x,y) \in M_i$ and a single real-valued scale factor $s \in R_+$. The resulting three-dimensional manifold $J_i = (M_i \times R_+)$ corresponds to a cortical layer of a single Brodmann area. To simplify the diagrams, we will draw the two-dimensional manifolds $\{M_i\}$ as rectangles with the understanding that in the neocortex, they will have very irregular outlines and due to the cortical sulci and gyri their actual physical shape will be very convoluted.

Examining the Ψ-MAP shown in FIG. 5, we now replace the images with three-dimensional "slabs" of thickness $z_0$.

The scaling parameter $s \in (0,\infty)$ is monotonically mapped to the interval $(0,z_0)$ that corresponds to the physical thickness of a single cortical layer in a particular Brodmann area. In the resulting three-dimensional spectral manifold, the pixels shown in FIG. 5 now correspond to voxels that represent the magnitude of specific spectral functions. A processing element, PE, takes as inputs voxels in a three-dimensional input spectral manifold, and produces as a result, values in a three-dimensional output spectral manifold.

Low-frequency spectral functions measure components over a large area of an image. Consequently, even though the PE has only local connections near an image point $(x_0,y_0)$, if the connections extend through the entire thickness of the cortical layer, its output value can change based on changes in the input image from the finest to the coarsest levels of detail. Moreover, the recursion in the Ψ-MAP allows the output values of PEs that correspond to low-frequency spectral functions to propagate quickly throughout the entire MAP in the search for an overall global solution.

We have limited our discussion to Ψ-MAPs that can recall associations between scalar value functions. We can however build Ψ-MAPs that associate complex or vector valued functions simply by using PEs that have complex or vector valued inputs and outputs.

In the n+m dimensional case, we can smooth a function $f \in L^2(R^n)$ using a convolution kernel $\gamma$ that is dilated by $s \in R_+^m$. The functions $$\varphi_{i,x,s} = -\frac{\partial \gamma}{\partial x_i}; 1 \le i \le N \qquad (9)$$

allow us to define a vector valued function $$g(x,s) = (\langle f, \phi_{1,x,s} \rangle, \ldots, \langle f, \phi_{N,x,s} \rangle) \qquad (10)$$

that estimates the gradient of f at a scale s. The function g can be used to estimate the partial derivative of f in the direction of a unit vector n by taking the vector inner product n·g.

We can further enlarge the vector space to obtain estimates of higher order derivatives of any degree required by taking higher order derivatives of the convolution kernel $\gamma$. Expanding the range of the original function, to a vector space of derivative values at multiple scales, facilitates the formation of Ψ-MAP image associations where edges or gradations in value are important.

Insight into the general principles that govern the nervous system requires the analysis of nomological models at many levels of detail stretching from biochemistry to ethology. At the level of the Λ-MAP and the Ψ-MAP Array, the operations are expressed in terms of associations formed between functions defined on multidimensional manifolds. A manifold is by definition a continuum. In contrast, a network is a directed graph, which by definition is discrete. A basic principle underlying the use of neural networks is that any given mental state can be described by a discrete N-dimensional vector of activation values. The unambiguous mathematical distinction between countable discrete sets and uncountable continua implies that, at this level of abstraction, the terminology of networks is inconsistent with the phenomena we are attempting to describe. Consequently, for mathematical correctness and clarity, we use the term neural manifold to denote the implementation of a general mechanism that transforms functions defined on continuous domains. More formally, for manifolds H and Q, and an arbitrary collection of inputs $\{h_\beta\} \subset L^2(H)$ and associated outputs $\{q_\beta\} \subset L^2(Q)$, a neural manifold G, is defined as a physical realization of a member of the set of transforms $\{G_\alpha\}$, for which $q_\beta = G_\alpha[h_\beta], \forall \beta$. As we will see, a neural manifold completely generalizes a neural network, and any calculation performed using a neural network has a simple and direct analog to a calculation performed using an NM.

When an urgent decision must be made, an organism that can effectively process clear and precise information has an advantage over one whose information processing is dull and indistinct. Based on teleonomic arguments, we must assume that evolution will favor manifold representations that have a high effective resolution over those with a low resolution when other factors such as processing time, metabolic energy and cellular hardware remain the same. Consequently, while the fast transmission of images must take place at the courser level of axons, the actual representation and processing takes place at the much finer level of neurotransmitters.

A neural manifold is an abstract model used to describe the density of neurotransmitter molecules and the operation of neuron patterns found in the CNS that, operating in parallel, transform functions defined on continua. It must be expected that many types of NMs have evolved over the course of evolution to solve the specialized equations unique to audition, vision and robotics. However, in the analysis of the neocortex, our primary concern is the general association NMs used to recall relationships between images.

At a finer level of detail, the cellular level, we begin to examine the computations of a single processing element. At this level of abstraction, we use a model that has continuous operands but discrete operators. The operands are functions representing the density of the continuous neurotransmitter "clouds". However, the operators, that is, the neurons, are viewed as discrete computational units.

At next finer level of detail, the molecular level, both the operands and operators are discrete. In the realm of natural computation, the neurotransmitters are now viewed as individual discrete molecules. In the realm of digital computers, at the molecular level, the operands are discrete multidimensional arrays of numbers and the operators are discrete arrays of CPUs.

Figure 8:
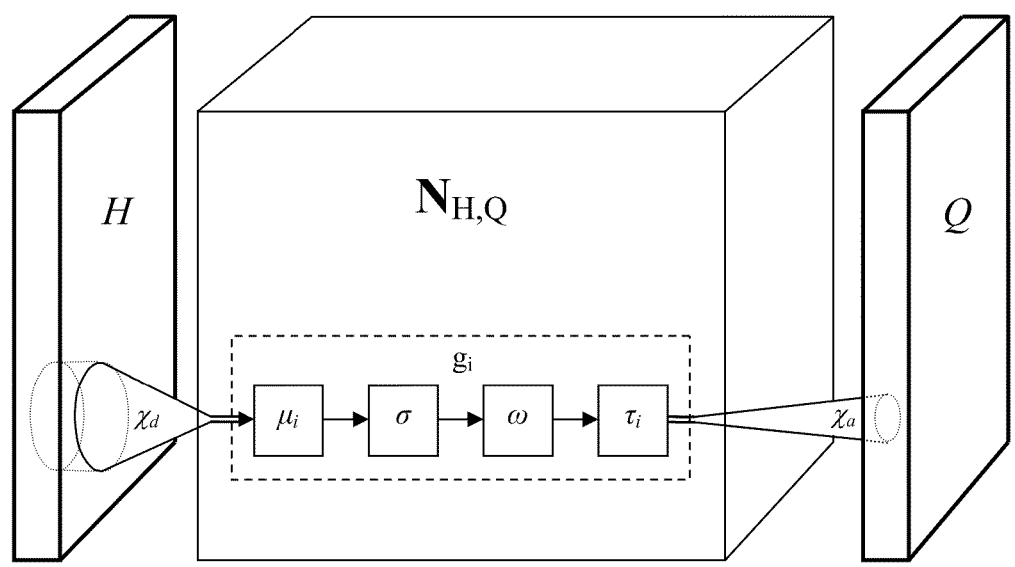
FIG. 8 illustrates the realization of a neural manifold at the cellular level.

FIG. 8 illustrates the realization of a NM at the cellular level. In this diagram, the input space H and the output space Q are both three-dimensional spectral manifolds parameterized by $(\xi,\eta,\zeta)$ and $(x,y,s)$ respectively. The PEs whose outputs pass through the boundary between H to Q are parameterized by the integer variable i.

FIG. 8 illustrates how the transformation can be implemented with an array of processing elements $\{g_i\}$, where each element simulates the operation of a single neuron. Each $g_i$ is composed of a receptor measure a cell-body-transfer function $\sigma$, a temporal filter $\omega$, a transmitter function $\mu_i$ and cell-membrane-transfer functions $\chi_d$ and $\chi_a$. The cell-body-transfer function, $\sigma$, and the cell-membrane-transfer functions, $\chi_d$ and $\chi_a$, can be assumed to take a form similar to neural-network sigmoid activation functions and be uniform throughout all cells, dendrites and axons. The receptor measure $\mu_i(\xi,\eta,\zeta)$ models the operation the dendritic arbor in the input manifold H, while transmitter function $\tau_i(x,y,s)$ models the signal distribution along the axon and the concomitant release of neurotransmitters into the output manifold Q.

FIG. 8 illustrates the processing element $g_i$ models the operation of a single neuron. The receptor measure $\mu_i$ converts the continuous distribution of neurotransmitter in the spectral manifold H to a single real value, while the transmitter function $\tau_i$, converts a single real value to a continuous distribution of neurotransmitter in the output manifold Q. The operation $\omega$ models the neuron's temporal response while $\sigma$ models the nonlinear response of the cell to the dendritic inputs. The nonlinear response of the dendrite cell membrane is represented by $\chi_d$ and the nonlinear response of the axon cell membrane is represented by $\chi_a$.

The receptor measures $\{\mu_i\}$ can be visualized as the three-dimensional dendritic tree corresponding to neuron i, where the dendrites have been "painted" with a shade of grey corresponding to their sensitivity to a particular neurotransmitter. When multiplied by the actual concentration of neurotransmitter present in the extracellular space, and integrated over a region of space that contains the dendritic tree, the result is a first-order approximation of the neuron's receptor sensitivity. Mathematically, the $\{\mu_i\}$ are signed measures (Kolmogorov & Fomin, 1970; Rudin, 1976) which define functionals that convert a function h defined on H to a real value.

The dendritic tree computation is defined using Lebesgue integration as $$\text{output} = \int_H h(\xi, \eta, \zeta) \, d\mu_i(\xi, \eta, \zeta) \tag{11}$$

To demonstrate why a neural manifold calculation subsumes the functionality of the standard neural network model, we examine the computation performed by a single-layer network with a single output node. For an n-dimensional input vector $x=(x_1 \ldots x_n)^T$, a weight vector $w=(w_1, \ldots, w_n)^T$, and a transfer function $\sigma$, the output, y, of a typical neural network is given by $$y = \sigma(w^T x) = \sigma\left(\sum_{k=1}^{n} w_k x_k\right) \tag{12}$$

To construct an analogous NM, identify the input vector x with any set of n distinct points $\{(\xi_k,\eta_k,\zeta_k); 1 \leq k \leq n\}$ in H, and let the input vector values $x_k = h(\xi_k,\eta_k,\zeta_k)$ be defined by some input function $h \in L^2(H)$. Let $\{\delta_k\}$ be the set of three-dimensional Dirac delta functions (product measures) defined by $$\delta_k = \delta(\xi-\xi_k)\delta(\eta-\eta_k)\delta(\zeta-\zeta_k) \tag{13}$$

For a single PE, $g_i$, assume the temporal filter $\omega$ has achieved a steady-state where the output is equal to its input, and let the transfer function $\sigma$ be the same as the one used for the neural network. Setting $$\mu = \sum_{k=1}^{n} w_k \delta_k \tag{14}$$

We have $$\sigma\left(\int_H h \, d\mu\right) = \sigma\left(\int_H h(\xi, \eta, \zeta)\left(\sum_{k=1}^{n} w_k \, d\delta_k\right)\right) \tag{15}$$

$$= \sigma\left(\sum_{k=1}^{n} w_k h(\xi_k, \eta_k, \zeta_k)\right)$$

$$= y$$

Thus, a neural manifold PE with the measure $\mu$, performs the same calculation as the single-layer projection neural network. The biological meaning of the measure $\mu$ defined above is a mathematical model of a neuron with n points (idealized synapses) each with sensitivity $w_k$ and located at the spatial positions $(\xi_k,\eta_k,\zeta_k)$ inside the input manifold H. The measures $\{\mu_i\}$ allow us to model precisely the shape and sensitivity of the dendritic tree for the neuron identified with each PE $g_i$. The use of the Lebesgue integral, instead of the conventional Riemann integral, allows us to model neurons that are in effect able to discriminate neurotransmitter concentration at a single point $(\xi_k,\eta_k,\zeta_k)$, but at the same time, may also exhibit sensitivity over entire regions.

To realize the receptor measures on a digital computer, we convert the spectral manifold to a three-dimensional grid of floating-point values. At this point, the integral again becomes a summation. However, since the receptor measures are defined on a manifold, they are independent of the resolution of the grid. Consequently, we can evaluate them on a high-resolution grid and then down sample them to the equivalent weights at a lower resolution for other computations.

The temporal filter $\omega$ can help control oscillations and add stability to the overal $\Psi$-MAP. These may be analog filters in the case of continuous time neural models or finite or infinite impulse response filters in the case of discrete time digital implementations (Oppenhiem and Schafer, 1975; Rabiner and Gold, 1975).

The relationship between the concentration of neurotransmitter in the extracellular space and the gating of the ion channels in the dendritic tree is characterized by the transfer function $\chi_d$. At some point, increasing the concentration of neurotransmitter has a diminishing effect on the ion channels; therefore, this function is nonlinear. Similarly, $\chi_a$ characterizes the nonlinear release of neurotransmitters by the axons terminals as a function of the neuron firing rate. The two cell-membrane-transfer functions, $\chi_d$ and $\chi_a$, as well as the cell-body-transfer function $\sigma$ are analogous to a sigmoid transfer function, such as $1/(1+\exp(-x))$ or the hyperbolic tangent function, that is used in neural networks. In the following, we will assume that $\chi_d$ and $\chi_a$, are real-valued functions of a single real variable and are uniform over the entire cell membrane. The spatial variations in the responses are represented using $\mu_i$ and $\tau_i$.

The transformation back to a continuous function q results from scaling each transmitter functions $\tau_i$ by the output of the temporal filter. If we include the time variable t, the complete output q is given by summing over all of the PEs $$q(x,y,s,t) = \sum_i \chi_a\left(\left(\sigma\left(\int_H \chi_d(h(\xi,\eta,\zeta,t)) \, d\mu_i(\xi,\eta,\zeta)\right)*r(t)\right) \cdot \tau_i(x,y,s)\right) \quad (16)$$

where * denotes the convolution operator and r(t) is the impulse response of temporal filter $\omega$. The integrals with respect to the measures $\mu_i$, and the summation over the transmitter functions $\tau_i$, in effect, perform operations analogous to the multiplication and summation by weight vectors in discrete neural networks.

The continuous version of a projection neural network defined by Equation (16) can be extended by generalizing the notion of a radial basis functions to neural manifolds. For discrete neural networks, a finite set of pattern vectors $\{x_m\}$ and a radial basis function $\theta$ form the nonlinear discriminate functions $\theta(\|x-x_m\|)$. The function $\theta$ has its maximum value at the origin and the properties $\theta(x)>0$ and $\theta(x)\to 0$ as $|x|\to\infty$. Typically, $\theta$ is the Gaussian, $\exp(-x^2/2\sigma^2)$, or a similar function.

To transition from discrete basis functions to the continuous, we begin by replacing the discrete pattern vectors $x_m$ with continuous density functions $\rho_\alpha$. Each of the functions $\rho_\alpha(\xi,\eta,\zeta)$ represents a "pattern" density defined on the input manifold. The patterns may be chosen from a finite set, or may represent samples taken from a continuum of patterns. In general, this continuum could be any parameterized set of functions over the spectral manifold J.

We may wish to associate a finite set of input patterns, $\rho_m$, with particular set of "target" or "label" functions $q_m$ in the output manifold. Since the PEs have local support, a distributed collection of PEs is required to cover the entire pattern density $\rho_m$. Assume the PE lattice is large enough so that many PEs are available for each pattern and we assign a particular pattern to each PE which we label $\rho_i$.

If we remove the convolution in time with the impulse response r(t) and omit the variables of integration $(\xi,\eta,\zeta)$ for h, and $\mu$ in (16) we have:

$$q(x,y,s) = \sum_i \chi_a\left(\sigma\left(\int_H \chi_d(h)\,d\mu_i\right)\cdot\tau_i(x,y,s)\right) \quad (17)$$

The equation corresponding to a basis-function (q) neural network can be obtained by substituting either $\theta(\chi_d(h)\chi_d(\rho_i))$ or the simpler $\theta(h-\rho_i)$ for $\chi_d(h)$ in Equation (17), which results in:

$$q(x,y,s) = \sum_i \chi_a\left(\sigma\left(\int_H \theta(h-p_i)\,d\mu_i\right)\cdot\tau_i(x,y,s)\right) \quad (18)$$

The processing elements PE(i) now have the additional property $\rho_i$, which represents the pattern to which they are the most sensitive. The integral inside Equation (18) is maximum when $h=\rho_i$ over the region of integration. This in turn maximizes the coefficient for the transmitter function $\tau_i$. The sum of a collection of transmitter functions $\{\tau_i\}$ associated with a particular input pattern $\rho_m$ can then be defined to approximate the desired "target" function $q_m$, thereby creating the required associations.

While many models that use action potentials as state variables form associations using matrix operations on a large vector of neuron outputs, equation (18) shows the neurotransmitter state model makes it possible for a small number of neurons, even a single neuron, to record an association between an input pattern $\rho_m(\xi,\eta,\zeta)$ and an output pattern $q_m(x,y,s)$.

The measures $\mu_i$ in Equation (18) can identify the regions where the pattern $\rho_m$ is the most "sensitive". For example, we can imagine photographs of two different animals that appear very similar except for a few key features. The photographs, representing the two patterns $\rho_i$ and $\rho_2$, would be approximately equal, but the various measures could be trained so that their value where the patterns were the same was small, but in the key regions where the patterns differed, they had much larger values. In this way, even though the two image patterns are almost the same, the output functions $q_m$ that result from the integrals in Equation (18) could be very different.

The receptor measure and the transmitter function perform the complementary operations of converting back and forth between functions defined on a continuous manifold and discrete real values.

While the receptor measures $\{\mu_i\}$, and transmitter functions $\{\tau_i\}$ are in general defined over local regions such as those shown in FIG. 8, it is worth emphasizing that they do not represent spectral functions or wavelets. They are however, defined over spaces where individual points $(x_0,y_0,s_0)$ represent spectral functions on the isomorphic images. The shape and sensitivity of the receptor measures do not correspond to spectral operators, but rather are the result of a process directed toward learning arbitrary associations based on local information. In general, this process will yield asymmetric, one-of-a-kind, irregular functions.

Figure 9A:
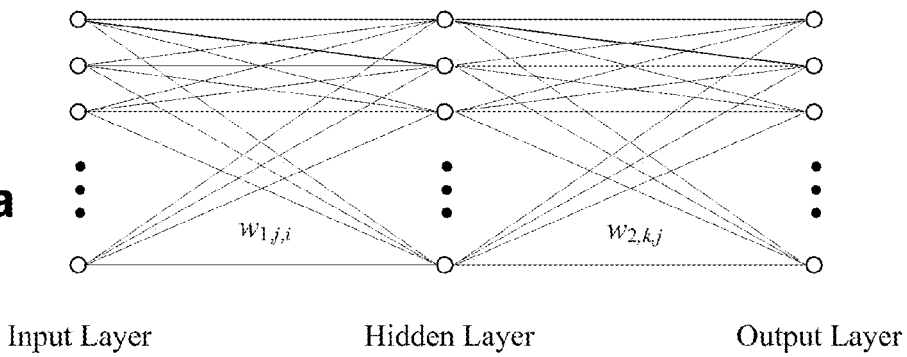
FIG. 9a illustrates a prior art neural network.

A single layer neural network has limited computational utility and multilayer networks are required to construct arbitrary associations between functions. A two-layer discrete neural network and the continuous neural manifold, are shown in FIG. 9a and FIG. 9c.

Just as the integral is the continuous counterpart of the discrete summation, the neural manifold is the continuous counterpart of the multiple-layer neural network. The neural network illustrated in FIG. 9a forms associations between discrete vectors, while the neural manifold illustrated in FIG. 9c forms associations between continuous functions. At the cellular level, FIG. 9b illustrates the processing elements (neurons) as discrete points in the function space $N_{H,Q}$.

As we have seen, the measures $\{\mu_i\}$ in the neural manifolds can replace the weights $\{\omega_{i,j}\}$ in the neural network. The same is also true of the transmitter functions $\{\tau_i\}$. In FIG. 9b, each PE $g_i$ (comparable to the $g_i$ shown in FIG. 8) performs an operation similar to that defined by equations (17) or (18). The patterns $\{\rho_i\}$ and measures $\{\mu_i\}$ analyze a region in the input manifold H and produce a discrete value. This value can be compared to a node in the hidden layer of a discrete neural network. Since the transmitter functions can extend over a large area, even the entire output image, many different processing elements may contribute to the value at any particular point (x,y,s). Consequently, the summations in equations (17) and (18) are equivalent to the summations in a neural network where the weights correspond to the values of the transmitter functions at any given point.

Figure 9B:
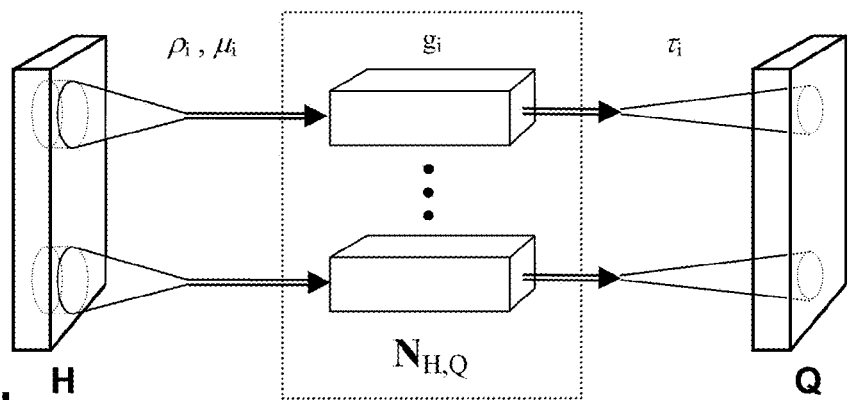
FIG. 9b is a cellular level illustration of manifolds, the hidden layer, and processing elements.
Figure 9C:
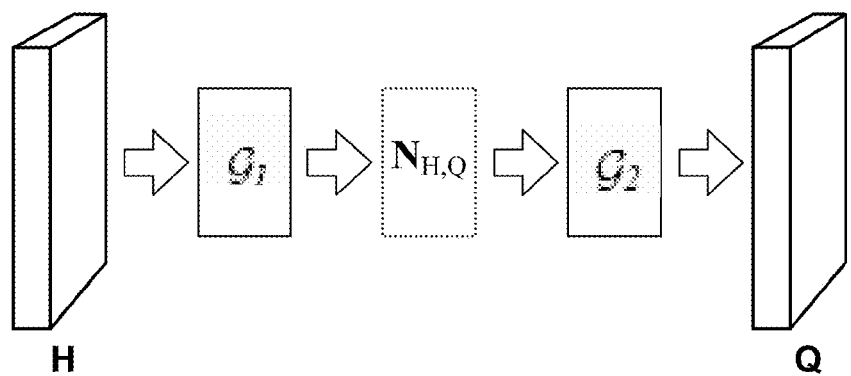
FIG. 9c illustrates a continuous neural manifold model.

The manifolds H and Q in FIGS. 9b and 9c represent the domains in which clouds of neurotransmitters would exist at some early point in the evolution of the nervous system. The processing elements, shown in FIG. 9b, represent neurons that perform an integration over the input manifold H using the receptor measure and disseminate the results in Q using continuous overlapping transmitter functions. Separately, both the receptor integration and the summation of transmitter functions perform the continuous analog of a single-layer neural network. Consequently, together they perform an operation analogous to a two-layer neural network.

The nodes of the neural network model are partitioned into the input layer, the hidden layer and the output layer. In the neural manifold model, the input layer is analogous to the input manifold H and the output layer is analogous to the output manifold Q. Both H and Q represent the continuous distribution of neurotransmitters in physical space. The "hidden" layer is the space $N_{H,Q}$, which equals the Cartesian product of two function spaces, the space of all possible measures on H and the space all possible output functions on Q. The individual neurons $g_i$ are points in this infinite-dimensional product space.

The interaction between the pre- and postsynaptic neuron across the synaptic cleft is often modeled as a single real-valued weight $w_{i,j}$ with the indices i and j enumerating the nodes that represent the pre and postsynaptic neurons. At the cellular level illustrated in FIG. 9b, nodes in the hidden layer $N_{H,Q}$ still represent neurons, but nodes in the input layer H, and the output layer Q, now represent the local concentration (density) of neural transmitter at specific locations (x,y,s).

The collection of transmitter functions and receptor measures that operate within a single neurotransmitter cloud can also be viewed as a two-layer neural network. In this formulation, the two-layer back propagation algorithm now takes place between the pre- and postsynaptic neurons with the errors propagating back from the receptor measures to the transmitter functions.

In FIG. 9b, the number of processing elements, $g_i$, used in the construction of the NMs will affect the accuracy and capacity of the NM, but otherwise are abstractly separated from their intended functionality, which is to associate functions representing continuous phenomena. This abstract association process is illustrated in FIG. 9c.

Equations (17) and (18) express the computations of a neuron that is sensitive to a single neurotransmitter. Given the variety of different chemicals that act as neurotransmitters, both inhibitory and excitatory, we clearly need to extend the model to account for their effects. If we have n different chemicals of interest in the extracellular space we can model their concentration at each point as vector with the direct sum $h(x,y,s) = h_1(x,y,s) \oplus h_2(x,y,s) \oplus \ldots \oplus h_n(x,y,s)$. Under the assumption that all of the all these substances act independently and their net effect on depolarizing the cell membrane is additive, we can extend the receptor measures the patterns $\rho_i$ and the transmitter functions $\tau_i$ in the same way and perform the integration and summation operations within (17) and (18) separately. Nonlinear interactions between the neurotransmitters on the dendritic tree cell membrane will require the appropriate modifications to the integral over the manifold H.

When samples of a continuous function that is defined on a space of high dimension are arranged in a space of much lower dimension, the samples will in general appear to be discontinuous. Consequently, when a collection of neurons $\{g_i\}$ representing samples taken from the infinite-dimensional space $N_{H,Q}$ are arranged in three-dimensional physical space, the result will look as if it is discontinuous. The resulting firing rates may appear to be stochastic when in fact they are deterministic. Moreover, realistic neural-field models that attempt to describe the observed firing rates of large groups of neurons as a continuous function in physical space will be difficult or impossible to create.

If M is an n-dimensional manifold, for a function $f \in L^2(M)$ and a scale vector $s \in R_+^m$, the spectral manifold over which $S[f](x,s)$ is defined has dimension n+m. Consequently, the transformed function is over-specified. Because of the redundancy, it is not true that any function $h \in L^2(M \times R_+^m)$ is the spectral transform of some function $f \in L^2(M)$.

To gain an intuitive understanding why this is the case, imagine the x–y plot of the one-dimensional function $f(x)$ that would be drawn in a trigonometry classroom. The resulting image has black pixels near the points $(x,f(x))$ and white pixels elsewhere. While it may be true that all one-dimensional plots can be drawn as two-dimensional images, it is not true that any image—for example a photograph taken outdoors—can be represented as a one-dimensional plot. While it is possible to construct continuous, dense, space-filling curves having infinite length (Munkres, 2000), in general, an arbitrary two-dimensional photograph does not have an "inverse" that corresponds to the plot of a one-dimensional analytic function.

The PEs in FIG. 4 compute the required outputs for a large number of stored associations based on only limited local information. Consequently, the overall result of these calculations can only be an approximation, which may not have a well-defined inverse transformation. However, using the reproducing kernel it is possible to estimate the approximation error and calculate the closest function for which the inverse spectral transformation exists.

For the one-dimensional case (n=m=1), the following equation defines the necessary and sufficient conditions for a function to be a wavelet transform (Mallat, 1999).

$$W[f](x, s) = \frac{1}{C_\varphi} \int_0^{+\infty} \int_{-\infty}^{+\infty} W[f](\xi, \eta) K(x, s, \xi, \eta) d\xi \frac{d\eta}{\eta^2} \quad (19)$$

where the constant $C_\varphi$ is given by Equation (4). The reproducing kernel K measures the correlation between the wavelets $\phi_{x,s}(\alpha)$ and $\phi_{\xi,\eta}(\alpha)$ and is defined by $$K(x, s, \xi, \eta) = \int_{-\infty}^{+\infty} \varphi_{x,s}(\alpha) \varphi_{\xi,\eta}(\alpha) d\alpha \quad (20)$$

$$= \langle \varphi_{x,s}, \varphi_{\xi,\eta} \rangle$$

Let $E=L^2(\mathbb{R} \times \mathbb{R}_+)$ and let U denote the linear subspace of E where the inverse wavelet transform exists. Using the reproducing kernel specified by (20) we define the linear operator V by $$V[f](x, s) = \frac{1}{C_\varphi} \int_0^{+\infty} \int_{-\infty}^{+\infty} f(\xi, \eta) K(x, s, \xi, \eta) d\xi \frac{d\eta}{\eta^2} \quad (21)$$

From (19), we note that for $f \in U$, $V[f]=f$. In a straight forward proof that will not be repeated here, it can be shown that V is an orthogonal projection of E onto U. If we view the local estimation errors in the calculations as additive noise w(x,s), then $$V[f+w]=f+V[w] \quad (22)$$

Since V is an orthogonal projection, $\|V[w]\| \leq \|w\|$. That is, V removes the component of the noise that is in $U^\perp$ and thereby projects the estimate to a function that is closer to the correct solution $f$.

From the definition of the reproducing kernel (20), we see that at a fixed position $(x_0, s_0)$ in the spectral manifold, the kernel $K(x_0, s_0, \xi, \eta)$ is zero or near zero for values of $(\xi, \eta)$ where the spectral functions $\phi_{x_0, s_0}$ and $\phi_{\xi, \eta}$ do not overlap. Moreover, K is defined in terms of the wavelets themselves and does not depend on the transformed function $f$. Consequently, at any point in the spectral manifold, we can pre-compute the function K, which goes to zero outside of a local neighborhood of $(x_0, s_0)$. Note that for low-frequency spectral functions, the overlapping regions will be large, but if the spectral functions are normalized, their inner product will still go to zero as the distance between $(x_0, s_0)$ and $(\xi, \eta)$ increases.

In multilayer-projection-neural networks, the computation in each layer equals a vector multiplied by a matrix followed by a nonlinear transfer function. If the nonlinear-transfer function is replaced by a linear one, then the matrices can be pre-multiplied and the multilayer network becomes a single layer network. An analogous result occurs if one of the transfer functions, $\sigma$, $\chi_d$ or $\chi_a$, are replaced with a linear operation in a multilayer neural manifold calculation. This allows the integral and summation signs to be interchanged and various interactions to be pre-computed. Although this may reduce the discriminating capacity of a multilayer network, it can also allow the effect of the reproducing kernel on the transmitter functions to be calculated in advance. For a one-dimensional function, if we replace the function $\chi_a$ with multiplication by a constant c in (17) we have $$q(x, s) = \sum_i c \cdot \sigma \left( \int_H \chi_d(h) d\mu_i \right) \cdot \tau_i(x, s) \quad (23)$$

If we now use the reproducing kernel K to project this onto the solution space of possible wavelet transforms we have $$q = V[q](x, s) \quad (24)$$

$$= \frac{1}{C_\varphi} \int_0^{+\infty} \int_{-\infty}^{+\infty} \left( \sum_i c \cdot \sigma \left( \int_H \chi_d(h) d\mu_i \right) \cdot \tau_i(\xi, \eta) \right)$$

$$K(x, s, \xi, \eta) d\xi \frac{d\eta}{\eta^2}$$

$$= \sum_i \sigma \left( \int_H \chi_d(h) d\mu_i \right) \cdot \left( \frac{c}{C_\varphi} \int_0^{+\infty} \int_{-\infty}^{+\infty} \tau_i(\xi, \eta) \right.$$

$$\left. K(x, s, \xi, \eta) d\xi \frac{d\eta}{\eta^2} \right).$$

That is, we can pre-compute the integral transform of the reproducing kernel on each of the transmitter functions $\tau_i$, and then sum over the results.

So far, we have discussed the reproducing kernel only for case of one-dimensional wavelets $\phi_{x,s}$. For the multidimensional case, we note that the definition (20) is expressed as an inner product on R which can be easily extended to the inner product on any spectral manifold J. In general, reproducing kernels require only the mathematical structure of a Hilbert space.

Linear transforms have properties analogous to those defined by S above. These transforms include frame operators and the dyadic wavelet transform. The discrete windowed Fourier transform and the discrete wavelet transform are both examples of the mathematics defined by frame theory.

We use the term "linearly transformed space" to refer to the space of inner products $\{\langle f, \phi_\gamma \rangle\}_{\gamma \in \Gamma}$ which characterize any signal f defined on a Hilbert space H. Note that H may be discrete or continuous and the set $\Gamma$ may be infinite.

Frame theory (Mallat, 1999) describes the completeness and redundancy of linear signal representations. A frame is a collection of vectors $\{\phi_n\}_{n \in \Gamma}$, where $\Gamma$ is a subset of the integers, that characterizes a signal $f$ from its inner products $\{\langle f, \phi_n \rangle\}_{n \in \Gamma}$. We define $b[n]=\langle f, \phi_n \rangle$. The sequence $\{\phi_n\}_{n \in \Gamma}$ is a frame on H if there exist two constants A>0 and B>0 such that for any $f \in H$ $$A\|f\| \leq \sum_{n \in \Gamma} |\langle f, \varphi_n \rangle|^2 \leq B\|f\| \quad (25)$$

For any frame, we define the "frame operator" T as $T[f](n)=b[n]=\langle f, \phi_n \rangle$. If the constant A is strictly greater than one, then the representation defined by the frame operator always contains redundant information.

If T is a frame operator, we denote by T* the adjoint of T defined by $\langle Tf, x \rangle = \langle f, T^*x \rangle$ where x is a sequence of real numbers in $l^2(\Gamma)$. For any frame $\{\phi_n\}_{n\in\Gamma}$ the dual frame is defined by $$\tilde{\phi}_n = (T^*T)^{-1}\phi_n \qquad (26)$$

and a pseudo inverse for T can be defined by $$\tilde{T}^{-1} = (T^*T)^{-1}T^* \qquad (27)$$

The dual frame allows us to define the reproducing kernel as $$K = \langle \tilde{\phi}_p, \phi_n \rangle \qquad (28)$$

A vector b[n] is a sequence of frame coefficients if and only if $$b[n] = \sum_{p\in\Gamma} b[p]\langle \tilde{\varphi}_p, \varphi_n \rangle \qquad (29)$$

For any b[n] which is not a sequence of frame coefficients, this equation defines an orthogonal projection V onto the nearest valid sequence of coefficients.

The association operations in a PsyMAP may take place in a linearly transformed space that is not a frame. However, frames guarantee that the inverse transform exists and that it is possible to define an orthogonal projection based on the reproducing kernel.

Neural network models usually form a matrix where the input neurons index the columns, the output neurons index the rows, and their interaction weights are the matrix coefficients. From an engineering point of view, a simple straightforward implementation of this matrix formulation for neural manifold will be problematic since for even moderate resolution one megapixel images, the matrix will have $10^{12}$ elements. While this matrix will be sparse due to the local connectivity of the neurons, because of the low-frequency spectral functions, multiplication and inverse operations will quickly result in non-zero values throughout the matrix. In fact, part of the importance of low-frequency wavelets in the recursive Ψ-MAP design, is that they help spread calculations performed in one small area over the entire image.

At the various levels of abstraction, it is important to preserve the connection to the underlying differential structure of the image manifolds. This mathematical structure is essential in maintaining the coherence with real-world natural phenomena and in providing the foundation for calculations such as the orthogonal projection based on the reproducing kernel. Digital simulations and general-purpose implementation require that that the manifolds be discretized, but there are many trade-offs to be made in determining the best resolution. Even within a single application, there may be advantages to maintaining representations at multiple resolutions. For example, we may wish to perform one operation such as learning at a high-resolution, while, for efficiency, the association formation (classification) process takes place at a lower resolution.

Although asynchronous design techniques have been around for some time, almost all digital computers utilize synchronous architectures that employ a clock signal to coordinate operations. Without a clock signal, a complex arrangement such as the Ψ-MAP Array shown in FIG. 6 would be difficult to control and prone to errors. Slightly unequal processing times for individual neurons or groups of neurons would inevitably occur, as would variations in transmission times due to differences in physical proximity. Over time, these errors would tend to be cumulative. An image, or the spectral representation of an image, only has meaning when all of the pixels or voxels maintain temporal coherence. Consequently, the necessity of processing and transmitting entire spectral manifolds suggests the need for a system clock, presumably arising from a central location such as the thalamus.

In the digital domain, the system clock is a regular pulse train that quickly transitions between the states zero and one. In the analog domain, however, the system clock can contain phase information that may facilitate computations on manifolds. For example, suppose the system clock is a periodic triangular wave, which rises linearly from its minimal value to its maximal value and then falls linearly to repeat the pattern. For reference, we will refer these two "sides" of the triangular wave as the rising and falling intervals.

In the definition of the spectral manifolds, we mapped the scaling parameter $s\in(0,\infty)$ monotonically to the interval $(0,z_0)$ that corresponds to the physical thickness of a single cortical layer. We now extend this correspondence by continuously mapping the interval $(0,z_0)$ to the interval between the minimal and maximal values of an idealized triangular wave system clock. In effect, the clock now sweeps back and forth through the spectral manifold thickness from the low-frequency spectral functions to the high-frequency spectral functions. A triangular wave clock signal can coordinate the implementation of progressive resolution algorithms that begin with an approximate solution based on the low-frequency information and progressively add the details associated with the high-frequency spectral functions. Alternately, following Marr's principle of least commitment (1976, 1983), we could make small incremental decisions starting with the local high-frequency details and progress to larger areas covered by the low-frequency wavelet functions.

A single-layer general association NM G can be recast as a progressive resolution algorithm in the following way. Label the corresponding scaling factor at clock phase θ as $s_\theta$. Modify G so that as the clock sweeps through the spectral manifold, at a particular clock phase θ, G only accepts the spectral inputs whose scaling parameters are in the interval $I=(s_\theta,\infty)$ [alternately $I=(0,s_\theta)$]. When the system clock reaches its extremum, $I=(0,\infty)$ and the output of a single-layer progressive resolution algorithm would be the same as a non-progressive version. Although a single-layer, progressive refinement NM considered in isolation would generate the same results as before, when used in a recursive design such as a Ψ-MAP, during the association process it can generate entirely different results.

In the previous discussion, we did not explicitly assign the minimum and maximum values of the system clock to the low or high frequency functions, and it may be that different classes of neurons make opposite assignments. Thus, during the rising and falling intervals of our idealized triangular wave clock, two separate computations may be performed, both of which use a progressive resolution method that starts with the high frequencies and progresses to the low frequencies. This allows us to design systems using a two-phased triangular clock as the control signal, but still maintain flexibility in the choice of algorithms.

Non-linear approximation methods can provide insight into encoding schemes that can represent arbitrary images with a relatively small number of predefined spectral components. These non-linear approximation algorithms generally assume an orthonormal basis for the wavelets. We describe how to extend these methods to find approximations in the general case of continuous spectral transforms. However, there is no guarantee that the inventive algorithms will produce optimal results, as is true for some methods that employ a wavelet basis.

Let $\bar{q}$ be a function defined on the spectral manifold Q and use the orthogonal projection V to calculate q, the function closest to $\bar{q}$ for which an image transform exists.

$$q = V[\bar{q}] \quad (30)$$

Denote the set of available pyramidal neurons in Q as $\Gamma = \{\gamma\}$, where each neuron is identified with the spectral function $\phi_\gamma$ having parameters $(x_\gamma, y_\gamma, s_\gamma)$. We will assume that the spectral functions $\{\phi_\gamma\}$ are normalized. Let $q_\gamma = q(x_\gamma, y_\gamma, s_\gamma)$ be the value of q corresponding to each pyramidal neuron.

Let $f_q$ be the image that corresponds to q. That is $$f_q = S^{-1}[q] \quad (31)$$

We wish to find a small finite subset $\Omega$, $\Omega \subset \Gamma$ that approximates $f_q$ with an error bound of $\epsilon$. The approximation $f_\Omega$ corresponding to the set of neurons $\Omega$ is given by $$f_\Omega = \sum_{\alpha \in \Omega} q_\alpha \varphi_\alpha. \quad (32)$$

We wish to minimize the error $$\sup_{\gamma \in \Gamma} |\langle f_q - f_\Omega, \varphi_\gamma \rangle| \quad (33)$$

A simple, straightforward algorithm is to start with $\Omega$ equal to the null set, and to iteratively perform the following two steps:
1. Select the neuron $\beta \in \Gamma$ which has the maximal (or near maximal) value of $$|\langle f_q - f_\Omega, \phi_\beta \rangle| \quad (34)$$

and add $\beta$ to the set $\Omega$.
2. If the error is below the threshold $$\sup_{\gamma \in \Gamma} |\langle f_q - f_\Omega, \varphi_\gamma \rangle| < \varepsilon$$

or the maximum number of iterations has been exceeded then quit, otherwise repeat.

In step two, depending on q and the $\{\phi_\gamma\}$, the error value may not converge to zero. Therefore, we include test for a maximum number of iterations. In step one, it may appear that on each iteration, we must recompute all of the inner products of $f_q - f_\Omega$ with all of the $\{\phi_\gamma\}$, however $$\langle f_q - f_\Omega, \varphi_\gamma \rangle = \left\langle f_q - \sum_{\alpha \in \Omega} q_\alpha \varphi_\alpha, \varphi_\gamma \right\rangle \quad (35)$$

$$= \langle f_q, \varphi_\gamma \rangle - \sum_{\alpha \in \Omega} q_\alpha \langle \varphi_\alpha, \varphi_\gamma \rangle$$

$$= q_\gamma - \sum_{\alpha \in \Omega} q_\alpha \langle \varphi_\alpha, \varphi_\gamma \rangle$$

Thus, when a neuron $\beta$ is added to the set $\Omega$, all that is necessary is to subtract the values $q_\beta \langle \phi_\beta, \phi_\gamma \rangle$ from the surrounding pyramidal neurons. However, the value $\langle \phi_\beta, \phi_\gamma \rangle$ is precisely the value of the reproducing kernel, K, and can be pre-computed. That is, the values can be hard-wired in the neuronal interconnections with preset weights. Presumably, this subtraction is analogous to the lateral inhibition between pyramidal neurons that is known to take place when a pyramidal cell fires.

Figure 10:
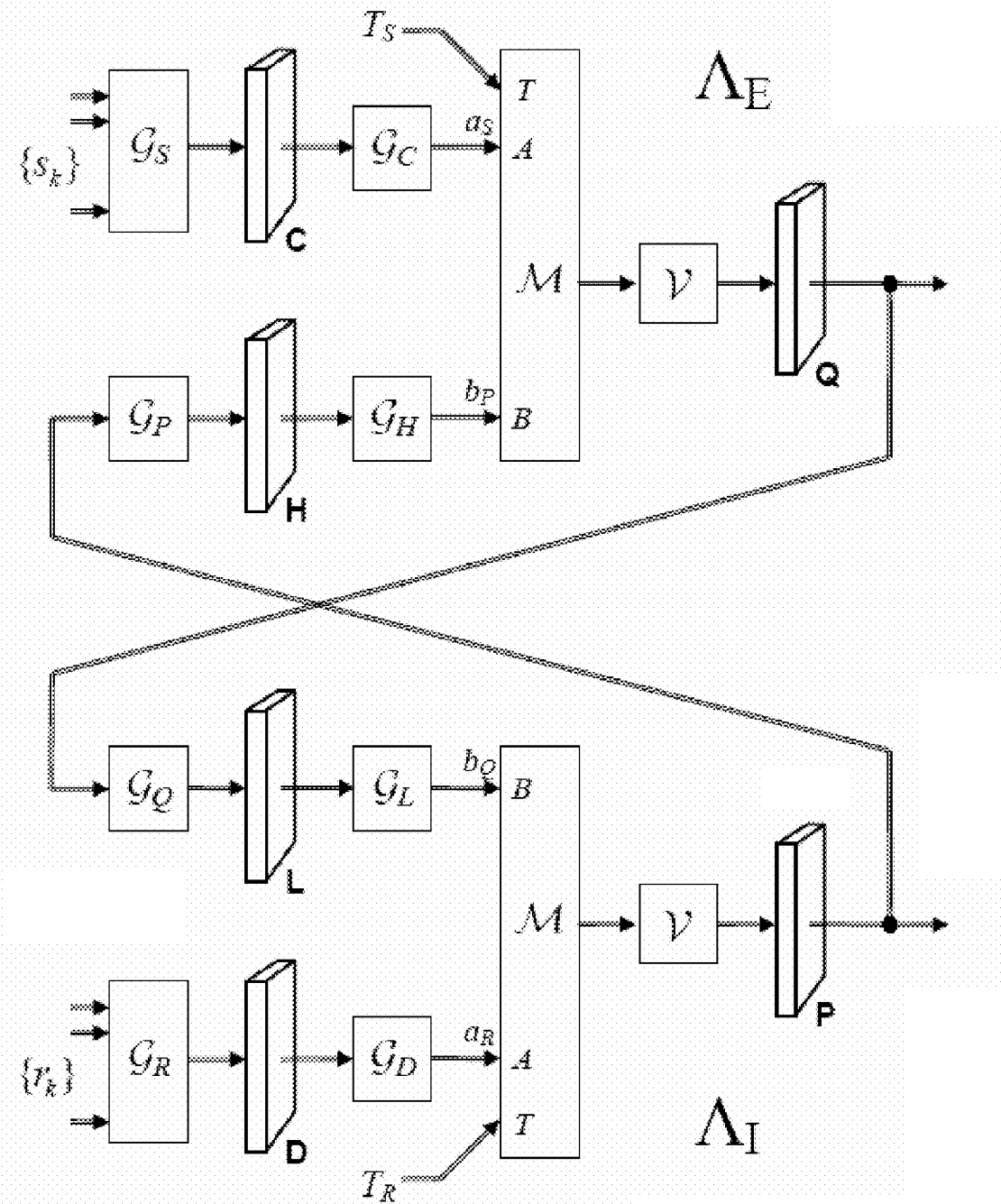
FIG. 10 is a diagrammatic view of the detailed Set-Reset Manifold Association Processor computational model illustrating a general pattern of interconnection.

It is possible to design several different types of digital flip-flops using simple binary logic gates. It is also possible to design several types of Ψ-MAPs using neural manifolds. FIG. 10 shows a detailed Ψ-MAP design that illustrates one possible architecture. Variations of this design can achieve the same or similar functionality, and it is clear that additional research will be required to determine the one used in the neocortex. Nevertheless, hypothesizing one or more concrete designs allows us to move forward by simulating, analyzing, and modifying candidate architectures. Some of the alternative architectures will exhibit slightly different input and output characteristics and by focusing on a small number of Brodmann areas, carefully formulated psychological experiments may be able to discriminate between some of the possible designs.

The detailed Ψ-MAP computational model in FIG. 10 illustrates the general pattern of interconnection. G denotes an association operation, M denotes the masking and multiplexing operation and V denotes the orthogonal projection based on the reproducing kernel. Each of the six spectral manifolds, C, H, Q, D, L and P are layered one-on-top the other to form the lamina of a single Brodmann area in the neocortex. Consequently, the connections between them are local and form the basis of the cortical columns.

The double lines in FIG. 10 represent the transfer of data defined on spectral manifolds. The transformations marked G, V and M represent different types of neural manifolds. The letter G denotes a general association NM, the letter V denotes orthogonal projections based on the reproducing kernel and the vertical box marked M performs multiplexing operations based upon the masks derived from the thalamic inputs marked $T_S$ and $T_R$. Note that each NM labeled G is trained with a different set of input and output relationships and consequently carries a unique subscript that identifies it as a unique transform. However, the NMs labeled V and M, do not carry subscripts since they perform a fixed operation that is the same in all instances.

All computations require some amount of time $\Delta t$ to finish, and even when it is not explicitly included in the equations, it is assumed that the NMs vary with time. We could make this time dependency explicit by including it in all of the equations, for example, $q(x, y, s, t+\Delta t) = G_H[h(x,y,s,t)]$. However, to simplify the discussion, we remove the time-dependent behavior by assuming that the Ψ-MAP is stable and that the inputs have remained constant sufficiently long for the Ψ-MAP to reach a steady state.

The inputs, $\{s_k\}$ and $\{r_k\}$, represent collections of spectral functions that arise from either subcortical regions or from the outputs of other Brodmann areas. The integration of data from three separate input images to form a single output pixel was illustrated in FIG. 4. However, in the context of the neuron model presented in FIG. 8, we see that the receptor measure $\mu$ is actually three separate measures $\{\mu_k\}$, one for each image. Mathematically we can view the collection of images as a single vector-valued image with a single measure $\mu = \mu_1 \oplus \mu_2 \oplus \ldots \oplus \mu_k$.

Since $\mu$ represents the sensitivity of a particular neuron's dendritic tree to a continuous "cloud" of neurotransmitter, if the transmitter functions from k separate images were released into the open physical space of the same manifold, the clouds of neurotransmitter would overlap and it would be impossible for the neuron to match the receptor measure $\mu_k$ with the appropriate input image $s_k$ or $r_k$. While it is possible for a dendritic tree to have varying sensitivity to several different neurotransmitters that represent the components of a vector-valued function, this conjecture may be unnecessary. Instead, synapses could establish an effective mechanism for separating the component images.

The synaptic cleft localizes the action of the neurotransmitter to the small region between the pre and postsynaptic neurons. A single synapse formed during the learning process establishes a connection to one specific input image. From the point of view of the postsynaptic neuron, once the connections have been established, there is no way to distinguish which synapses are associated with which inputs. However, from an overall systems point of view, the dendritic computation could behave like separate integrations over the vector space formed by the direct sum of image components and receptor measures.

If $G_S$ (or $G_R$) forms the same output association for several members of a given collection of inputs $\{s_k\}$; $s_k \in L^2(S_k)$ (or $\{r_k\}$; $r_k \in L^2(R_k)$), then the associations will mutually reinforce one another since for any receptor measure $\mu$ $$\int_S s\,d\mu = \sum_k \int_S s_k\,d\mu_k \tag{36}$$

and $$\int_S r\,d\mu = \sum_k \int_S r_k\,d\mu_k \tag{37}$$

Consequently, even though single inputs may not be sufficiently strong to bring forth a recollection, multiple inputs will add "context", and their combined effect may surpass a threshold required to evoke the entire memory.

The overall pattern of interconnection for the Ψ-MAP shown in FIG. 10 is the same as that shown in FIG. 3 but we have now filled in the internal details of the Λ-MAPs. The Ψ-MAP shown contains eight general manifold association processors labeled G, divided evenly between the external and internal Λ-MAPs, $\Lambda_E$ and $\Lambda_I$. Each of these can be considered to be analogous to a single-layer neural network, that is a summation followed by a nonlinear transfer function. This single-layer computation may be performed in either the dendritic tree or the axonal tree.

We use the product notation to denote the composition of transforms, and write $G_H G_P[p]$ for $G_H[G_P[p]]$, which is the output of first transforming p by $G_P$ and then transforming the result by $G_H$. In FIG. 10 we assume that the composition of these two transforms corresponds to the synapses between the axonal trees and dendritic trees within one neurotransmitter layer, but it could also correspond to the calculations in the dendrites and axons of a single layer of neurons. We will use the term neural manifold to denote the operation analogous to both single and multi-layer neural networks.

In $\Lambda_E$, the NM $G_C G_S$ transforms the inputs $\{s_k\}$, while $G_H G_P$ transforms the recursive input from P. Symmetrically, in $\Lambda_I$, the NM $G_D G_R$ transforms the inputs $\{r_k\}$, while $G_L G_Q$ transforms the recursive input from Q.

The multiplexor masks allow the thalamus to focus attention on selected regions and to control whether individual Brodmann areas accept new inputs or retain their current contents. Each of the reciprocal Λ-MAPs, shown in FIG. 10, contains two separate, NMs whose outputs feed into a multiplexor box labeled M. A third input, shown with a diagonal line, is the control mask, which is marked $T_S$ in the exterior Λ-MAP and $T_R$ in the interior Λ-MAP. Both multiplexors perform the same operation, and inside the box the two association inputs are labeled A and B. For reference however, we will label the $\Lambda_E$ inputs $b_P$ and $a_S$, and the $\Lambda_I$ inputs $b_Q$, and $a_R$. From FIG. 10 we see that $$a_S = G^C G_S[\{s_i\}]$$

$$a_R = G^D G_R[\{r_i\}] \tag{38}$$

and $$b_P = G^H G_P[\{P\}]$$

$$b_Q = G^L G_Q[\{q\}] \tag{39}$$

To distinguish between the two separate general association neural manifolds inside each Λ-MAP that process the two separate input images, we will refer to a NM that corresponds to either $a_S$ or $a_R$ in FIG. 10 as an input NM and a NM that corresponds to either $b_P$ or $b_Q$, as a latch NM.

Let $\alpha(x,y,s)$ be one of the thalamic mask signals $T_S$ or $T_R$. These can control the multiplexor by performing an operation analogous to the image composition alpha blending calculation used in computer graphics (Foley, van Dam, Feiner and Hughes, 1990; Thompson 1990). For $\alpha \in [0,1]$ the result of the alpha blending operation is given by $$\text{output} = (1-\alpha)A + \alpha B \tag{40}$$

When $\alpha=0$, the output equals A, and when $\alpha=1$, the output equals B. Values in between smoothly blend the two images. If we want the ability to force the output to zero, during the two phases of the clock we can transmit a second mask $\beta(x,y,s)$ which we simply multiply by the output. Thus, when $\beta$ is equal to zero everywhere, the output will be forced to zero as well.

At this point, in what we might call "the masking problem", we find a tradeoff between computation and accuracy. The problem arises because we would like to perform a bitwise mask of the image data, but the data that is available is the spectral representation of the images. Unlike Fourier transforms, the multiplication of two wavelet transforms does not correspond to a convolution operation on the untransformed data (Pérez-Rendón & Robles, 2004). If we want to perform a bitwise masking operation, then during each time step, for a spectral operator S, we would have to compute the inverse and forward calculations:

$$M[A,B,\alpha,\beta] = S(\beta((1-\alpha)S^{-1}[A] + \alpha S^{-1}[B])) \tag{41}$$

An alternative is to proceed with the multiplication on the spectral data and accept the resulting indistinct "blurriness" that results. At higher frequencies, the masks will be sharper since these spectral functions have smaller support. The complete expression for the pointwise masking operation is then:

$$M[A,B,\alpha,\beta](x,y,s) = \beta(x,y,s)((1-\alpha(x,y,s))A(x,y,s) + \alpha(x,y,s)B(x,y,s) \tag{42}$$

Since the spectral manifold has a higher dimension (three) than the original image space (two), there are many spectral functions, for which there is no corresponding image. Mathematically, almost all functions h defined on the spectral manifold H, do not have an inverse $S^{-1}[h]$.

The result of an association formed in a two layer real-valued neural network will undoubtedly contain small errors that result in "invalid" spectral functions. Moreover, in general, a masking operation such as the one defined by Equation (42), will also result in a spectral function that does not correspond to the transform of an actual image.

Images used as masks do not need to be generated by a separate control mechanism and can in fact be generated by other Ψ-MAPs in the Ψ-MAP array. The capability to generate masks within the array itself significantly extends its power and flexibility.

Fortunately, using the reproducing kernel defined in Equation (20) we can project these functions using the linear operator V given in Equation (21) to the nearest function for which the inverse transform $S^{-1}$ produces a valid result. This operation is shown in FIG. 10 following the multiplexing operation. Since the results of the orthogonal projections are Q and P, we thereby guarantee that the outputs of a Ψ-MAP always correspond to actual images.

As long as the control signals $\alpha(x,y,s)$ and $\beta(x,y,s)$ in Equation (42) are identically equal to one, in both the exterior and interior Λ-MAPs, the Ψ-MAP will ignore its inputs and retain its current stored value. Under these conditions, the Ψ-MAP is latched and the contents of this short-term memory remain fixed on the outputs q and p. During this time, the recursion equations that regulate the operation of the Ψ-MAP are:

$$q = VG_H G_P[p]$$

$$p = VG_L G_Q[q] \quad (43)$$

Even though FIG. 10 does not show any clock signals, similar to the ground signal in a conventional circuit diagram, we assume that a clock is available to any component that requires it. Suppose an analog, (e.g. triangular wave) clock is used by the NMs $G_Q$, $G_P$, $G_H$, $G_L$, $G_S$, and $G_R$ to implement a progressive resolution algorithm. During a single clock cycle, the computation may start with associations formed from the low frequency (or high frequency) components of the image and gradually proceed by adding spectral information in the progressively higher (or lower) frequency ranges.

During classification, when the Ψ-MAP is accepting inputs and forming new associations, the use of progressive resolution algorithms may have advantages and disadvantages. If we consider $f=(q,p,h,l,c,d)$ as a point in the product space of functions defined on Q, P, H, L, C, D then $f$ follows a trajectory from an initial point determined by the inputs and previous state to a new "solution" state. An advantage of the progressive resolution method is that this trajectory to a fixed point becomes more predictable. A possible disadvantage is that the trajectory may predictably lead to the wrong solution. This may result when two or more reciprocal image pairs have inputs that appear similar at low or high frequencies but are associated with completely different outputs. Thus, the input NMs may need to accept a range of frequencies that is sufficient to cause the paths to bifurcate, when needed, during the early stages of the classification process.

When a Ψ-MAP is latched, in a steady-state condition, if we combine the two Equations in (43) we have:

$$q_0 = VG_H G_P VG_L G_Q[q_0] \quad (44)$$

That is $q_0$ will be a fixed point of this six-layer NM transformation.

We define $$Z \equiv VG_H G_P VG_L G_Q$$

and label successive outputs formed as part of the association process as $q_i$. Thus $$q_{i+1} = Z[q_i] \quad (45)$$

If for $c<1$ $$\|q_{i+1} - q_i\| = \|Z[q_i] - q_i\| \le c\|q_i - q_{i-1}\| \quad (46)$$

in a complete subspace U, then Z is a contraction and by the contraction lemma (Spivak, 1979) we are guaranteed that there exists a unique fixed point, $q_0$, in U. Note that since the metric space must be complete, that is all Cauchy sequences must converge, in some cases, it may be necessary to form the closure the original space (Kolmogorov & Fomin, 1970; Royden, 1988).

The existence of regions where Z is a contraction are important because they imply stability. If Z is a contraction in a subspace U that contains an open neighborhood about $q_0$, then even if there is a small amount of added noise, the Ψ-MAP will follow a trajectory back to $q_0$.

Learning at the level of synapses takes place by modifying sensitivity of the dendritic tree and by modifying the release of transmitters by the axonal tree. The learning algorithms used for training neural networks have similar counterparts in neural manifolds. Several neural network methods use a gradient decent algorithm based on a sum-of-squares error function E. Suppose an NM G, composed of PEs $\{g_i\}$, must associate a finite set of input functions $\{h_\beta\} \subset L^2(H)$ with the output functions $\{q_\beta\} \subset L^2(Q)$. Based on Equation (18), under steady-state conditions, we can express the total error as $$E(\mathcal{G}) = \sum_\beta \int_Q (\mathcal{G}[h_\beta] - q_\beta)^2 \quad (47)$$

$$= \sum_\beta \int_Q \left( \sum_i \chi_\alpha \left( \sigma\left( \int_H \theta(h_\beta - p_i) d\mu_i \right) \cdot \atop \tau_i(x, y, s) \right) - \atop q_\beta(x, y, s) \right)^2 dx\, dy\, ds$$

To evaluate these equations, we convert the integrals to sums by discretizing the spectral manifolds H and Q. If the receptor measures and transmitter functions are non-zero on only small local regions in H and Q respectively, the computation required to estimate the integrals is significantly reduced.

When the input manifold H is converted to voxels, the receptor measures and transmitter functions are both converted to a set of weights $\{w_\alpha\}$. Once discretized, we can use standard neural network algorithms to search for an error minimum where $$\frac{\partial E}{\partial w_\alpha} = 0 \quad (48)$$

In converting the integral to a sum, we restricted the region of integration to locations where the receptor measure was non-zero. Although the resulting weights will be non-zero only in this small region, we may wish to expand the region slightly to include voxels (adjacent to the dendritic tree or the axonal tree) where the weights have a zero value. Doing so may increase the accuracy and capacity of the Ψ-MAP, at the cost of increasing the computation required to determine associations. If the reception measure is a model of a physical neuron, the weights will be non-zero only on or near the surface of the dendrites or axons. By including the voxels that are adjacent to the surface, but have a zero weight, we can simulate the physical three-dimensional growth of a neuron as it learns new associations.

Since a conventional two-layer neural network has a single input vector and a single output vector, training the network is simply a matter of forming associations between one set of inputs and one set of outputs. A Ψ-MAP on the other hand has two sets of input images, two sets of output images, two control masks and four neural manifolds. We will discuss six different types or categories of learning. For each category, we describe only one example with the understanding that within each category other similar cases are possible, the most obvious once corresponding to reversing the roles of the exterior and interior Λ-MAPs. Each of the six categories describes the training of a single NM. The CNS presumably combines several of these "elemental" learning methods to form complex "composite" learning mechanisms, both within a single Ψ-MAP, as well as between multiple processors in a Ψ-MAP array.

Figure 11:
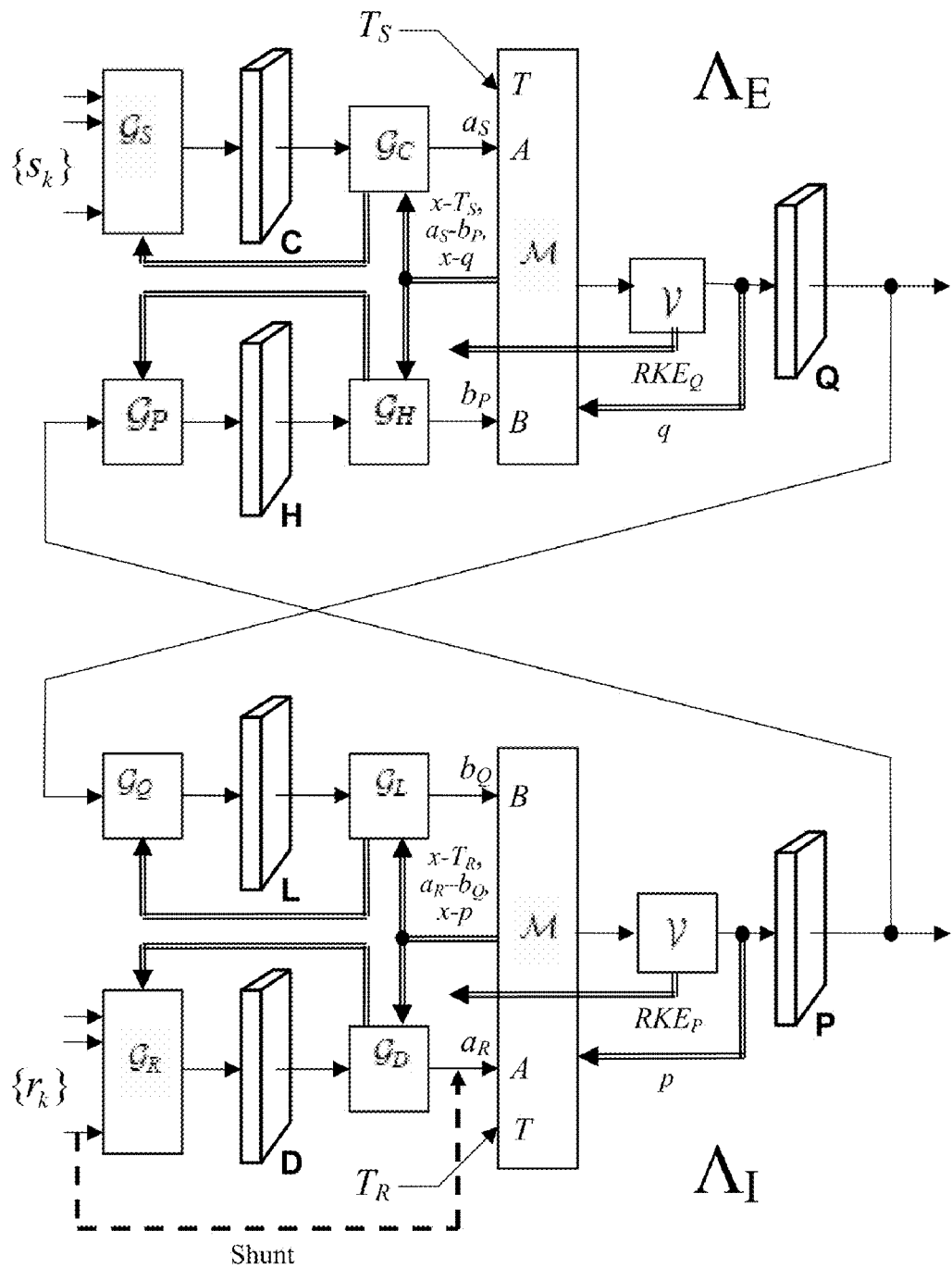
FIG. 11 is a diagrammatic view of the Set-Reset Manifold Association Processor learning pathways.

In FIG. 11, we have shown the previously discussed connections with thin lines and added heavy double lines for the image connections used in learning. Also shown are feedback paths for q and p from the output of the projection operator V.

Including the control mask, the multiplexing box M has three separate inputs, A, B and T. The difference between any two of these inputs, A–T, B–T, A–B or A–(p or q) can act as an error term that feeds back from M to train the general association NMs. For simplicity, the Fig. shows a single pathway, which transmits any one of the various difference terms back from the multiplexor to the NMs; however, it is clearly possible to have separate pathways for the separate difference terms. Analogous to a two-layer neural network, the error from the second half of a NM must propagate back to the first half.

FIG. 11 is a diagram illustrating the Ψ-MAP learning pathways, that are illustrated with heavy double lines, and feed the three-dimensional error signals used for training back to the input and latch NMs of the exterior and interior Λ-MAPs. The line feeding back from the multiplexor M can carry any of the x–T, A–B or x–q (x–p) difference signals, where x represents either the A or B multiplexor inputs. The difference between the input and the output of the orthogonal projection operator is the Reproducing Kernel Error (RKE) and measures the amount by which the multiplexor output differs from the nearest possible image.

In the first of the six types of learning, we train an input NM based on an image from the thalamus. During the normal operation previously illustrated in FIG. 10, the inputs $T_S$ and $T_R$ were control signals. Now however, they function as data signals. For some arbitrary input $s_k$, we can train the exterior Λ-MAPs to generate the output $q_0 = V[T_S]$ simply by feeding back the error signal $a_S - T_S$, and using it to train the $Λ_E$ input NMs. A symmetric operation in the reciprocal interior Λ-MAP can associate $ρ_0 = V[T_R]$ with some input $r_k$.

Suppose the input NMs of $Λ_E$ associates an input $s_k$ with an output $q_0$, and the latch NMs of $Λ_I$ associate an input $q_0$ with some output $ρ_0$, that is, $q_0 = VG_C G_S[s_k]$ and $p_G = VG_L G_Q[q_0]$. If we want to retain the output pair $(q_0, p_0)$ in short-term memory when the input $s_k$ is no longer present, we must train the latch NMs of $Λ_E$ to associate the input $p_0$ with the output $q_0$. While $s_k$ is still present, the multiplexor error signal A–B contains the necessary information to train the $Λ_E$ latch NMs so that $q_0 = VG_H G_P[p_0]$.

Note that if the Λ-MAPs have two separate feedback paths for the A–T and B–T error terms, and we present inputs $s_0$, $r_0$, $T_S$, and $T_R$ to the Ψ-MAP at the same time, it is possible to train all four NMs simultaneously. In this case, either or both of the inputs $s_0$ or $r_0$, can be used to recall the associated reciprocal image pair $V[T_S]$, $V[T_R]$.

In the third category of learning, assume that the input NMs of $Λ_E$ associates an input $s_k$ with an output $q_0$, and both Λ-MAP latch NMs are trained to retain the output pair $(q_0, p_0)$ when $s_k$ is removed. A secondary association is a relation between this same output pair $(q_0, ρ_0)$—whatever it may be—and other inputs. If the Ψ-MAP is latched, it can learn secondary associations by using the error signals A–B to train the input NMs when presented with one or more other inputs $\{r_i\}$ or $\{s_i\}$.

Suppose rather than data images, we again use the thalamic inputs to perform an image masking operation. Following the masking operation and the projection V, we can feed the output of V, representing a masked image subregion, back to the input and latch NMs as the error signal x–q or x–p, where x is either of the multiplexor inputs A or B. By using the same learning methods as before, we can now train the NMs to associate a particular subregion of an image with some input image or the reciprocal Λ-MAP output.

As is the case with a neural network, in a general association NM there is no direct path from the input to the output. We refer to a pathway that bypasses one of the four general association NMs as a shunt. Without shunts, it is not possible to copy one of the inputs $\{r_i\}$ or $\{s_i\}$ directly to the outputs p or q. In FIG. 11, we have shown a single shunt for the input NMs of the interior Λ-MAP with a heavy dashed line. Shunts on the other three NMs are also possible but have been omitted from the diagram. Connections corresponding to shunts may or may not be present in the CNS since similar results are possible by learning from images transmitted indirectly via the thalamus. Various combinations of shunts, and methods equivalent to the formation of the latch and secondary input associations described above, make it possible to train the Λ-MAPs in analogous ways.

Referring to FIG. 11, beneath the orthogonal projection operations labeled V and leading back toward the input and latch NMs is an image signal labeled RKE for reproducing kernel error. Unlike the previous error signals, the RKE signal is not derived from a new data image that needs to be remembered, but rather serves to improve other learning processes.

Let $\bar{q}$ and $\bar{p}$ denote the output of the exterior and interior Λ-MAP multiplexors respectively. The association relationships established by the input and latch NMs are at best approximations and will inevitably contain small errors. Moreover, there is no guarantee that the results of a masking operation are valid image spectral representations. For the one-dimensional case, Equation (21) specifies how the reproducing kernel K provides an orthogonal projection V that will map $\bar{q}$ and $\bar{p}$ to the nearest functions q and p for which the inverse spectral transform exists. The difference between the input and the output of V is the reproducing kernel error:

$$RKE_Q = \bar{q} - q = \bar{q} - V[\bar{q}]$$

$$RKE_P = \bar{p} - p = \bar{p} - V[\bar{p}] \tag{49}$$

Since the projection V is orthogonal, it is idempotent. If the output of the multiplexer is already equal to a valid image transform then q=V[q] and the error signal, RKE, will be identically equal to zero.

The RKE signal can help train the input and latch NMs by serving as an error signal that helps to "fine tune" the NM association formation process so that they generate outputs that are more accurate. In addition, the formation of new associations may introduce errors into existing "old" associations. When recalled, the RKE signal can help to "re-tune" these old associations so the unwanted side effects of the new associations are eliminated or reduced.

In analyzing the counterparts of Ψ-MAP array model in the nervous system, it is essential to distinguish between computational models and physiological models. Just as an optimizing compiler may modify an equation for better performance, we should expect that the CNS will modify a computational model to reduce the required number of neurons and the total expenditure of energy. Mathematically, this correlation can be expressed as an equivalence class defined by the relation that two models are equivalent if for any set of inputs, they always generate the same outputs. Within this framework, a good computational model is one that is as close as possible to the physiological model, with the caveat that the computational model may be slightly transformed to make it easier to understand as long as it remains in the same equivalence class.

The vast majority of the synaptic connections in the neocortex are local, that is, they arise from neurons that lie within close physical proximity. The Ψ-MAP design specifically prescribes an interconnection architecture where the PEs have local support.

The neocortex contains billions of neurons continuously processing data in parallel. The intrinsic structure of the Ψ-MAP design specifies massive lattices of PEs, all constantly processing data. Moreover, all of the individual Ψ-MAPs within the array can operate concurrently.

The neurons in the cerebral cortex are neatly organized into uniform layers rather than a large globular mass. There are six cellular layers found throughout the neocortex. The pattern of interconnections between these six layers is also homogeneous throughout the neocortex. A Ψ-MAP Array model consists of collection of Ψ-MAPs all having the same organization of image spectra and the same pattern of interconnection.

Between the cortical layers, many local loops exist where a given neuron, projects onto other local neurons, which in turn form circuits or loops that project back onto the original neuron. Referring to FIG. 10, the spectral manifolds H, Q, L, P, R, and S are layered one on top of the other. Consequently, the connections between them are local, and form loops analogous to the cortical columns.

Based on the cytoarchitecture, the cerebral cortex is divided into a relatively small number of distinct Brodmann areas. The demarcation between the Brodmann areas is determined by the varying prominence or thickness of the six cellular layers. However, within each Brodmann area, the thickness of the cellular layers is the same. The striking similarity in structure and connectivity implies that all of the Brodmann areas are performing a similar operation.

Each Ψ-MAP in the Ψ-MAP array corresponds to a unique Brodmann area but has the same general design. The number and source of the inputs and the number of associations formed will undoubtedly vary between Ψ-MAPs and even between the internal and external Λ-MAPs of a single Ψ-MAP. These variations will affect the computational requirements of the different cortical layers causing them to vary in thickness between Brodmann areas. However, the number of image inputs, and the number of associations within any given Brodmann area are the same, suggesting that within each area the thicknesses of the layers should also be the same.

Several of the Brodmann areas contain well-documented computational maps that correspond to sensory inputs and motor control actions. These two-dimensional images have a topographic structure that maps to each particular sensory modality. During the course of evolution, sensory and motor control computational maps were presumably some of the earliest images processed by the CNS. Computational maps have a well-defined topographic structure, which is an ideal match with the concept of neural manifolds and image association processors.

The connections between Brodmann areas are topographically organized. That is, during the transfer of information between Brodmann areas, points that are close to each other at the source are also close to each other at the destination. The transfer of images, or their spectral representations, to other parts of the Ψ-MAP array, requires the preservation of the underlying topographic structure.

The interface between two neurons occurs at the synapse. While electrical synapses are common in invertebrates, most synapses in the mammalian nervous system are chemical, where one or more neurotransmitters mediate the signal transmission between the pre- and post-synaptic neurons. While the average concentration of a continuous "cloud" of neurotransmitter representing the value of function defined on a manifold may be the correct model at a high level of abstraction, as a physiological implementation such a cloud would have problems with temporal inertial and unwanted diffusion. Synapses confine the region where the neurotransmitter is present to the synaptic clefts, thereby restricting the diffusion and allowing the transmitter to be quickly reabsorbed or metabolically catalyzed.

In addition to their important function of creating "virtual" neurotransmitter clouds that are more efficient and responsive, the synapses could also play a critical role in the separation of vector-valued components. In the Ψ-MAP system equations subsection covering multiple inputs, we discussed how Equations (36) and (37) describing the combination of inputs from any number of images could be implemented with a single type of neurotransmitter by using synapses to maintain the partition.

In the standard neural network model, a synapse corresponds to a single weight that represents the effect the presynaptic neuron has on the postsynaptic neuron. In the neural manifold model, a single layer of neurons performs the computation of a two-layer neural network where the second layer of nodes is the concentration of neurotransmitters in the extracellular space. One set of weights corresponds to the amount of neurotransmitter released by the cell membrane of the axonal tree and the second set of weights corresponds to the sensitivity of the cell membrane of the dendritic tree. In this context, back-propagation algorithms that set the weights in multilayer neural networks can operate within the confines of the synaptic regions with errors in the weights corresponding to the dendrite sensitivity propagating back to the weights corresponding to the axon output.

There is a significant cost to transmit signals along an axon whose length can be measured on a macroscopic scale. To send the value of every single pixel in an image over a relatively long distance would require an unnecessary expenditure of energy. A more efficient approach is to encode the image spatially so that it can be sent using a relatively small subset of the available neurons. The pyramidal neurons appear to play a role in the encoding required to transmit images with a minimal consumption of metabolic energy. The nonlinear encoding algorithm described above in Equation (35) represents an image with only a few predefined spectral functions. Since the spectral functions corresponding to nearby pyramidal cells are not orthogonal, a lateral inhibition, equal to the value of the reproducing kernel, allows the selection of a single prominent spectral function in each local neighborhood.

The nonlinear encoding algorithm permits the specification of an error threshold that may change over time. Consequently, the nervous system can dynamically shift the trade-off between accuracy and the expenditure of metabolic energy to meet the demands of the current situation. For example during a fight-or-flight response the CNS may be willing to expend all of the available energy in exchange for high accuracy, while during periods of hunger, or inactivity it may sacrifice accuracy in order to conserve energy. During these low-energy periods, the images would become "dull" or "hazy" and determining the correct associations would be more difficult and prone to errors.

There may be a physiological correlation between some of the neocortical cells and the reproducing kernel used the projection operator V. There are many types of neurons in the neocortex, including chandelier cells, basket cells, neurogliaform cells, double bouquet cells, and bitufted cells. Any of these cells may be involved in reproducing kernel computations, but the chandelier cells in particular have several relevant characteristics.

Once the set of spectral functions have been specified, the reproducing kernel, K, is fixed and consequently, the calculations can be done by neurons with a static dendrite or axon response. Furthermore, the projection V can be computed locally, since if the spectral functions have local support, so does K. Given its utility in reducing errors (see Equation (22)), teleonomic arguments imply a projection analogous to V is likely to take place in the CNS.

Chandelier cells project exclusively to initial portions of axons of pyramidal cells. They are GABAergic so their effect is to subtract from the pyramidal cell's value. The physical extent of the chandelier cells is limited in the direction perpendicular to the cortical surface so that they are generally contained within a single layer. This suggests that their function is limited to a single spectral manifold and is consistent with the projection operator V shown in FIG. 10. Also, the receptive field of the chandelier cells is larger with less acuity than the pyramidal cells. This would be expected since for a fixed $\gamma$, the reproducing kernel $\langle\phi_\alpha,\phi_\gamma\rangle$ has a larger region of support than the corresponding spectral function $\phi_\gamma$.

In the central nervous system of vertebrates, there are 10 to 50 times more glial cells than neurons. Unlike neurons, glial cells do not generate action potentials. Consequently, if state is assumed to be encoded in the firing of neurons, glia are relegated to a support role. However, in a neurotransmitter-centric model they can take a central position along side neurons. They can participate in both short-term and long-term memory as well as computations. Without action potentials however, the results of the calculations performed by glial cells will be transmitted more slowly.

To simplify the computational model, each of the spectral manifolds Q, P, H and L receives inputs from only one of the other manifolds. However, there is no a priori reason that requires this limitation. In particular, even though a model difficult to mathematically analyze a model where the NMs receives inputs from multiple sources, it may have advantageous performance characteristics that would promote its adoption during the course of natural selection.

The neocortex contains two distinct bands of Baillarger, the external band and internal band. Inputs from the thalamus project mainly to the bands of Baillarger which are affiliated with the overlays $T_Q$ and $T_P$, used by masking operation M. The bands of Baillarger may also be involved in learning from thalamic inputs. Intracortical connections also project to several other strata including the molecular and multiform layers and modifications to the computational model may be required to adequately represent these connections.

The nearly simultaneous triggering of even a small fraction of the neurons in a single area will generate a local current density sufficient to generate a measurable voltage potential on the scalp. An immediate consequence of the hypothesis that spectral manifolds are synchronously processed or transferred in the CNS is electroencephalograms (EEGs). Such variations in neuron triggering rates will inevitably occur during the transitions of the system clock. While EEGs provide evidence of synchronous calculations within the neocortex, this is not to say that EEGs are a system clock, but rather that EEGs result from the synchronous processing or transfer of entire spectral manifolds in unison.

Following a certain stage in development, no new neural cells are formed in the cerebral cortex. Learning occurs by extending or otherwise modifying the existing dendritic trees. After a $\Psi$-MAP has begun to form associations, inserting additional untrained PEs into the lattice will introduce local errors in the manifold calculations and consequently degrade the overall performance.

Memories are not lost by the death of a few neurons. Since the relationships are between image spectra, if the associations are stored using multiple PEs, the removal of some of the PEs from a $\Psi$-MAP lattice will not result in a noticeable change in its external behavior.

Receptive fields similar to the ones in the visual processing system are known to exist for the other senses. For example the touching a single point on the surface of the skin is generates a response over an entire region in the lateral postcentral gyrus. Since associations are between the spectral transforms of images and not the images themselves, sensory inputs such as retinotopic maps, tonotopic maps and somatotopic maps must first be transformed into the distributed spectral representation used in the neocortex before they can be processed.

The CNS is able to integrate the diverse sensations of touch, proprioception, vision, and hearing along with prior memories and knowledge to form a coherent and consistent understanding. Referring back to FIG. 4, it shows how a single PE fuses together regions from three separate images. The topographic organization allows any number of images to be overlaid and combined as inputs to a single $\Psi$-MAP that can then form a coherent and integrated concept.

Visual hyperacuity, the ability to perceive image data at a resolution that is higher than the spacing between the rods and cones in the retina, is paradoxical when expressed in terms of neuron action potentials. However, by making use of the information that encodes the small eye movements or microsaccades, it is possible for a neurotransmitter-cloud model to create and store a visual model at a much higher resolution.

Short-term memory forms an integral part of our conscious awareness and has fundamentally different characteristics than long-term memory. Long-term memory is the result of modifying the receptor measures by training an NM to associate an output image with one or more input images. Short-term memory, on the other hand, is the array of the reciprocal images that are currently holding each other in place in each of the $\Psi$-MAPs.

Old memories may become "hazy" or lost. However, "hints" or other context can suddenly evoke them, and bring back a very clear recollection. Within a single $\Psi$-MAP, all of the PEs are involved directly or indirectly in the formation and recollection of each association. If an association is created, but seldom used, it will likely become "weaker" as other new associations are formed. When this occurs, some of the original input patterns may evoke a response that is too weak to bring back the associated image. However, if a $\Psi$-MAP has many inputs, some small additional context from the other images may suddenly bring back the entire reciprocal image pair that in turn may evoke additional details from other parts of the array.

Old and faint memories do not become progressively more blurry as would be expected of an image that is losing resolution. Instead, they retain some portion of their high-frequency detail. Spectral representations contain both high and low frequency components. As errors are slowly introduced due to of the formation of new memories, the old memories will still contain some information across the spectral range.

Even though individual neurons have primarily local connections, en masse they exhibit emergent properties that lead to a unified, cohesive global behavior. The Ψ-MAP Array architecture specifies how uniform lattice, composed of a massive number of small processing elements working in parallel, can achieve an overall, globally integrated result.

We define an "image" or "signal" to be any function defined on a manifold. These may be analog or digital. Examples of signals are audio recordings, photographs, video recordings, or arbitrary spatial diagrams.

Each PsyMAP in a PsyMAP Array performs input, processing, and output operations. The input process may consist of accepting a signal from another PsyMAP, from another intermediate processing device, or from an outside transducer that performs some type of physical measurement. The output of a PsyMAP is another signal, which is analog in nature, but may carry digital information the same way an analog voltage signal can be used to transmit digital data. As an example, we can imagine a photograph as a "distributed bar-code" where we identify multiple regions of the image as part of a single "bar" and use the average of pixel values taken within the regions to make binary assignments. We could define average values between 0.0 to 0.2 equal to "zero" and average values between 0.8 to 1.0 equal to "one". In this manner, multiple regions in a PsyMAP output signal or image can be equated with an arbitrary ASCII character or character string. Consequently, a "Manifold Association" process is also a signal recognition process that can be used to identify, classify, or analyze any input signal and have the output interface with any discrete digital device.

Fundamentally, the PsyMAP methods are mathematical expressions that can be evaluated by a variety of digital and analog devices. While the use of optical computers may be possible, we expect that typical implementations will be done on a digital computer. Because of the number of possible trade-offs between image resolution, processing power, processing time, association capacity, association accuracy, and the number of PsyMAPs in the PsyMAP Array, it is possible to execute the algorithms on hardware ranging from handheld devices to the largest of supercomputers. Applications suitable for small consumer devices might include handwriting recognition, while more powerful machines will be required for large image data sets and fast throughput. The results of the analysis may be stored onto a volatile or non-volatile storage medium such as a hard disk drive, a flash memory, or other suitable storage medium, and the results of the analysis may be displayed on the computer CRT (terminal), any other display device, printed out on paper, or printed on any other suitable medium.

The PsyMAP algorithms are inherently parallelizable and consequently can be implemented either by a single processor or by a large number of processors. Parallel implementations can be constructed using multiple processors that operate on different (but somewhat overlapping) sections of the same image, as well as assigning the processors to different images within the PsyMAP Array.

The following examples illustrate different applications of the present invention:

EXAMPLE 1

Speech Recognition

An exemplary application is a speech recognition device for a personal computer (PC). A microphone connected to the PC provides an input signal to a manifold array processor, while the output is the stream of characters corresponding to the words spoken by the user. The incoming audio signal first undergoes frequency analysis pre-processing such as a windowed Fast Fourier Transform (FFT). This would be followed by a Ψ-MAP classifier/recognizer and then followed by post-processing to write the Ψ-MAP output to a character stream. These calculations could be performed by the main CPU (central processing unit) of the PC itself or on a small separate "daughter" card attached as a peripheral to the main circuit board. The daughter card may contain a single microprocessor or multiple processors and a combination of one or more programmable digital signal processing (DSP) chips.

EXAMPLE 2

Pen Stroke Analysis

A handheld Personal Digital Assistant (PDA) device may have a touch-sensitive screen that records the pressure of pen strokes on its surface. The recorded result (x(t),y(t)) is a vector valued function defined on a one-dimensional manifold (time). A pre-processing step may scale or normalize the signal by performing arc-length encoding or translating it so that it is centered about its two-dimensional center-of-gravity. The signal may then be used as input to several Ψ-MAPs within a Ψ-MAP array, which analyze it for the presence of various characteristics such as corners or intersections. The outputs of the individual Ψ-MAPs may then be topologically aligned as inputs to a final Ψ-MAP stage using the one-dimensional equivalent of the two-dimensional alignment shown in FIG. 4. This last Ψ-MAP stage in the array may then recognize the topologically aligned inputs and produce a single signal corresponding to a waveform that encodes the bits of an ASCII character that was drawn on the screen of the PDA. These characters can then be used anywhere that a keyboard input would normally be required, such as a word processing program or text messaging application.

EXAMPLE 3

Two-Dimensional Image Encoding

In some applications, the input is an image, for example, from a CCD camera or imaging array, which generates a digital signal that is then associated with an encoded image, such as a bar code or character stream, where the code may represent a word that identifies or describes the object within the image. Generally, the present invention is applicable to any image or signal that can encode digital data, such as face recognition, handwriting recognition, object recognition, etc. In a face recognition application, a person's social security number can be associated with a bar code in which is encoded the person's image. It should be noted that bar code is used as an example, and other symbols, including one or more alphanumeric characters may be used to encode the image or signal.

EXAMPLE 4

Image Encoding—Histology

The collection of images from a single tissue sample taken under a microscope at high magnification represents a huge data set that is difficult and tedious for a human operator to analyze. Searching this data set for diseased or cancerous cells is a critical step in medical diagnosis.

Various types and shapes of convolution kernels can be used to estimate gradients, edges and textures in an image.

Symmetric and asymmetric kernels may form the frame functions for one Ψ-MAP in a Ψ-MAP Array and the corresponding output images may be used as inputs or masks to another Ψ-MAP. The topological alignment of gradient, texture and color inputs may be used to identify individual cells and cell boundaries. The output of this "cell-identification" stage may be a mask that equals zero outside the cell and equals one inside. This mask is then used by a classification Ψ-MAP that uses texture and color information to classify the cell type. A stable reciprocal image pair within a single Ψ-MAP defines each class with one of the images corresponding to a "barcode" or other binary encoding of the class identifier. Multiple classes would exist for various types of healthy and diseased cells. The output of system would be a written report that is read by a physician or medical technician. The report may contain overall statistics on cell types as well as sample images of suspected pathogens or cancerous cells and their estimated boundaries.

Since this histology application would be incorporated into a system containing costly microscopy equipment and would probably be used in a high-throughput specimen processing facility, it will likely be cost effective to construct it using a large multiprocessing system with hundreds or even thousand of CPUs.

EXAMPLE 5

Handwriting Recognition

Handwriting recognition has an output similar to the "penstroke analysis" described above, but the input is a scanned two-dimensional image rather that the one-dimensional path describing the motion of a pen in time. Known image processing techniques can generate representations that are invariant under translation, scale and rotation operations. These transformations in combination with Ψ-MAP arrays can be used to read and process handwritten forms, letters or diagrams.

EXAMPLE 6

Three-Dimensional Shape Analysis—Oncology

Magnetic Resonance Imaging (MRI) and Computed Tomography (CT) are commonly used medical diagnostic devices that provide three-dimensional volumetric data. The same Ψ-MAPs array theory described for two-dimensional images works equally well in three or more dimensions. For MRI and CT processing, we may use three-dimensional spherically symmetric wavelets. The resulting spectral manifold is then four-dimensional. For an oncology application, the patient image data is searched for the presence of tumors. One on the Ψ-MAPs in a Ψ-MAP array has two stable states corresponding to "Tumor" and "Non-Tumor". These two states could be represented by all white and all black images in one of the two Ψ-MAP outputs. Whenever this Ψ-MAP switches to the "tumor" state the position and characteristics are recorded and included in a report sent to a medical technician or radiologist. The Ψ-MAP is then reset and the scanning of the dataset continues until completed.

Example 7

Three-Dimensional Face Recognition

Several techniques such as stereoscopic reconstruction and laser scanning are available which automatically construct a representation of the surface of a three-dimensional object. The representations may be volumetric (voxel) or polyhedra that can be easily converted to voxels. In a voxel representation, a voxel has a value of one if the cube is completely inside the object and a value of zero if it is outside. Voxels on the surface have a value proportional to the percentage of the cube inside the object. The recognition can be accomplished using the three-dimensional version of the two-dimensional image encoding described above. Since the bone structure of the face is fixed, once the data has been aligned with the sagittal plane of symmetry, face recognition based on three-dimensional structure is more reliable than two-dimensional photographic techniques that can be easily thrown off by makeup, eyeglasses, and facial hair. Using the measures defined for neural manifold pattern associations, the recognition process may be adjusted so that some regions of the face have greater importance in the similarity calculations.

EXAMPLE 8

Hand Gesture/Sign Language Recognition

A video signal is a two-dimensional image changing in time and can therefore be regarded as a function defined on a three-dimensional manifold. Similarly, a volumetric (voxel) representation of a person speaking in sign language is a function defined on a four-dimensional manifold (3D space× time). Using the image encoding "bar-code" technique describe above, we can associate a finite set of signs or gestures with a finite set of digital codes. In this manner, a Ψ-MAP array gesture recognition device could be interfaced with a text application in the same way as a speech recognition device.

EXAMPLE 9

Industrial Inspection

An imaging device may be positioned over an assembly line or conveyor belt that causes parts or materials to come into view. Multiple Ψ-MAP within an array may analyze the object in terms of various characteristics such as shape, texture, and color. Imperfections may be determined not just as discrete individual tokens, but on a continuous scale measured in degrees of severity and described by a function defined on a manifold that is "overlaid" on the actual object. One of the Ψ-MAPs, which directly or indirectly accepts inputs form all of the other Ψ-MAPs in the array, would be bi-stable with two special predefined output images corresponding to "Accept" or "Reject". This binary output would then be sent to the assembly line control mechanism.

EXAMPLE 10

Noise Removal

If the content of a signal is known a priori to come from a restricted set of inputs, then recognizing which particular element is present and using that information to create a reconstructed output can have the effect of reducing noise. For example, if all of the fonts and font sizes used to produce a document are known, recognition of the characters and there positions can be used to produce a new document that is relatively free of background noise. The effect is the same as if a human operator had re-entered text from an old and severely degraded printed document.

Application Encodings

The commonality in all of these examples is that encoding or transforming functions has many useful purposes. These often result from a many-to-one mapping that takes a infinite variety of different input functions and maps them to a smaller, perhaps finite, set of output functions. The Ψ-MAP Array methods combine several characteristics that allow it to be used in a very wide range of applications. These include: 1) a new neuron model that makes learning associations easier and faster, 2) the ability to specify frame functions that define a linearly transformed space that is best suited to the particular sub-task, 3) the ability to combine and integrate any number of inputs from external sources or other PsyMAPs and 4) an orthogonal projection based on the reproducing kernel that uses redundancy information to reduce noise and increase stability in the reciprocal images. Together, these capabilities create a very flexible and powerful function transformation system with many uses and applications.

The foregoing description of preferred embodiments is not intended to be limited to specific details disclosed herein. Rather, the present invention extends to all functionally equivalent structures, methods and uses as may fall within the scope of the appended claims.

REFERENCES (incorporated herein by reference)

Addison, P. S. (2002). *The Illustrated Wavelet Transform Handbook*. Bristol, UK: Institute of Physics Publishing.

Amari, S. (1997). Mathematical theories of neural networks. In E. Fiesler & R. Beale (Eds.) *Handbook of Neural Computation*. Oxford University Press.

Ciuca, I., & Ware, J. A. (1997). Wavelet networks as an alternative to neural networks. *Proceedings of the IEEE 6th International Conference on Emerging Technologies and Factory Automation*.

Daubechies, I. (1992). *Ten Lectures on Wavelets*. Philadelphia: Society for Industrial and Applied Mathematics.

DeGroot, M. H., & Schervish, M. J. (2001). *Probability and Statistics* ($3^{rd}$ ed.). Reading: Addison-Wesley.

Deqiang, L., Zelin, S., & Shabai, H. (2004) A wavelet network classifier. *IEEE 7th International Conference on Signal Processing*, 2, 1479-1482.

Foley, J. D., van Dam, A., Fiener, S. K., & Hughes, J. F. (1990). *Computer Graphics: Principles and Practice*. Reading: Addison-Wesley.

Galvão, K. H., Becerra, V. M., Calado, J. M. F., & Silva, P. M. (2004). Linear-wavelet networks. *International J. of Applied Mathematics and Computer Science*, 14(2), 211-232.

Gnedenko, B. V. (1968). *The Theory of Probability* (Seckler, B. D. Trans.). New York: Chelsea.

Greer, D. S. (2003). A Unified System of Computational Manifolds. *Tech. Rep. TR-CIS*-0602-03, Dept. of Comp. and Info. Sci., IUPUI, Indianapolis, Ind.

Gonzalez, R. C., & Woods, R. E. (1992) *Digital Image Processing*. Reading: Addison-Wesley.

Hebb, D. O. (1949). The Organization of Behavior. New York: Wiley

Hopfield, J. J. (1982). Neural networks and physical systems with emergent collective computational capabilities. *Proceeding of the National Academy of Science*, 79, 2554-2558.

Horn, K. P., & Brooks, M. J. (1989). *Shape from Shading* (Eds.). Cambridge: MIT Press.

Ibnkahla, M., Puechmorel, S., & Castanié, (1994) The vector back propagation algorithm. *Proceedings of World Congress on Neural Networks*, 346-351.

Iyengar, S. S., Cho, E. C., & Phoha, V. V. (2002). *Foundations of Wavelet Networks and Applications*. Boca Raton: Chapman & Hall.

Jain, A. K. (1989). *Fundamentals of Digital Image Processing*. Englewood Cliffs: Prentice-Hall.

Jin, L., & Gupta, M. M. (1999). Stable dynamic backpropagation learning in recurrent neural networks. *IEEE Trans. Neural Networks*, 10(6), 1321-1334.

Kelly, D. H. (1975). Spatial Frequency Selectivity in the Retina. *Vision Research*, 15, 665-672.

Knudsen, E. I., du Lac, S., & Esterly, S. D. (1987). Computational maps in the brain. *Annual Review of Neuroscience*, 10, 41-65.

Kohonen, T. (1972). Correlation matrix memories. *IEEE Trans. Computers*, C21, 353-359.

Kohonen, T. (1974). An adaptive associative memory principle. *IEEE Trans. Computers*, C23, 444-445.

Kohonen, T. (1982). Self-organized formation of topologically correct feature maps. *Biological Cybernetics*, 43, 59-69.

Kohonen, T. (1984). *Self-organization and associative memory*. Series in Information Sciences, 8, Berlin: Springer-Verlag.

Kohonen, T. (1995). *Self-organizing maps*. Heidelberg: Springer.

Kolen, J. F., & Kremer, S. C. (2001). *A Field Guide to Dynamical Recurrent Networks* (Eds.). New York: IEEE Press.

Kolmogorov, A. N., & Fomin S. V. (1970). *Introductory real analysis*. New York: Dover.

Kosko, B. (1988). Bidirectional associative memories. *IEEE Trans. Systems, Man and Cybernetics*, 18(1), 49-60.

Kulkarni, A. D. (1994). *Artificial neural networks for image understanding*. New York: Van Nostrand Reinhold.

Logothetis, N. K., Pauls, J., & Poggio, T. (1995). Shape representation in the inferior temporal cortex of monkeys. *Current Biology*, 5(5), 552-563.

MacLennan, B. (1997). Field computation in motor control. In P. Morasso & V. Sanguineti (Eds.), *Self-Organization, Computational Maps, and Motor Control*, 37-73. Amsterdam: Elsevier.

MacLennan, B. (1998). Field computation in natural and artificial intelligence. In *3rd International Conference on Computational Intelligence and Neuroscience*. Durham, N.C.

Mallat, S. (1999). *A Wavelet Tour of Signal Processing* ($2^{nd}$ ed.). San Diego: Academic Press.

Marr, D. (1976). Early Processing of Visual Information, *Philosophical Trans. Royal Society of London, Series B, Biological Sciences*, 275, 483-519.

Marr, D. (1983). *Vision: a computational investigation into the human representation and processing of visual information*. New York: Freeman & Co.

Medsker, L. R., & Jain, L. C. (2000). *Recurrent Neural Networks: Design and Applications*. (Eds.), New York: CRC Press.

Michel, A. N., Farrell, J. A. (1990). Associative Memories via Artificial Neural Networks. *IEEE Control Systems Mag.*, 10(3), 6-17.

Miikkulainen, R., Bednar J. A., Choe, Y., and Sirosh, J. (2005). *Computational Maps in the Visual Cortex*. New York: Springer.

Minsky, M., L., & Papert, S. (1969). *Perceptrons: an Introduction to Computational Geometry*. Cambridge: MIT Press.

Monad, J. (1971). *Chance and necessity: an essay on the natural philosophy of modern biology* (Trans. A. Wainhouse). New York: Knopf.

Munkres, J. R. (2000). *Topology* (2nd ed.). Upper Saddle River: Prentice-Hall.

Nevatia, R. (1982). *Machine Perception*. Englewood Cliffs: Prentice-Hall.

Oppenheim, A. V., & Schafer R. W. (1975). Digital signal processing. Englewood Cliffs: Prentice-Hall.

Pearlmutter, B. A. (1995). Gradient calculations for dynamic recurrent neural networks: a survey. *IEEE Trans. Neural Networks*, 6(5), 1212-1228.

Pérez-Rendón, A. F., & Robles, R. (2004). The convolution theorem for the continuous wavelet transform. *Signal Processing*, 84, 55-67.

Puechmorel, S., Ibnkahla, M., & Castanié (1994). The manifold back propagation algorithm. *Proceedings of the IEEE International Conference on Neural Networks*. 1, 395-400.

Rabiner, L. R., & Gold, B. (1975). *Theory and Application of Digital Signal Processing*. Englewood Cliffs: Prentice-Hall.

Rao, S. S., & Kumthekar, B. (1994). Recurrent Wavelet Networks. *Proceedings of the IEEE International Conference on Neural Networks*, 5, 3143-3147.

Renart, A., Brunel, N., & Wang, X. (2003). Mean-field theory of irregularly spiking neuronal populations and working memory in recurrent cortical networks. In Feng (Ed.) *Computational Neuroscience: A Comprehensive Approach*. Boca Raton: CRC Press.

Riaza, R., Sanchez, G., & Zufiria, P., J. (2002). Recurrent Learning. In *Foundations of Wavelet Networks and Applications*. Boca Raton: Chapman & Hall.

Royden, H. L. (1988). *Real analysis* (3rd ed.). Englewood Cliffs: Prentice-Hall.

Rudin, W. (1976). *Principles of mathematical analysis* (3rd ed.). New York: McGraw-Hill.

Rumelhart, D. E., Hinton, G. E., & Williams, R. J. (1984). Learning internal representation by error propagation. In D. E. Rumelhart & J. L. McClelland (Eds.) *Parallel Distributed Processing*, 1, 313-362. Cambridge: MIT Press.

Saitoh, S. (1997). *Integral Transforms, Reproducing Kernels and their Applications*. Essex: Addison Wesley Longman.

Santiago, R., & Lendaris, G. G. (2005). Reinforcement learning and the frame problem. *Proceedings of the IEEE International Joint Conference on Neural Networks*, 5, 2971-2976.

Schneider A., & Sigillito, V. G. (1991). Two-layer binary associative memories. In O. Omidvar (Ed.), *Progress in Neural Networks*. Norwood: Ablex Publishing.

Schutz, B. (1980). *Geometric methods of mathematical physics*. Cambridge University Press.

Seiffert, U., & Jain, L. C. (2002). *Self Organizing Neural Networks* (Eds.). Heidelberg: Physica-Verlag.

Shen, J., & Balakrishnan, S. N. (1998). Robustness analysis of Hopfield and modified Hopfield neural networks in time domain. *Proceedings of the 37th IEEE Conference on Decision & Control*, 1046-1051.

Shi, Z., Huang, Y., & Zhang, J. (2004). Neural field model for perceptual learning. *Proceeding of the Third IEEE International Conference on Cognitive Informatics*, 192-198.

Sima, J., & Orponen, P. (2003). General-purpose computation with neural networks: A survey of complexity theoretic results. *Neural Computation*, 15(12), 2727-2778.

Skarbek, W., & Cichocki, A. (1996). Image associative memory by recurrent neural subnetworks. *IEICE Trans. Fundamentals of Electronics, Communications and Computer Sciences*, E79-A (10), 1638-1646.

Slavova, A. (2003). *Cellular Neural Networks: Dynamics and Modelling*. Dordrecht: Kluwar.

Spencer, R. G. (2001). Bipolar spectral associative memories. *IEEE Trans. Neural Networks*, 12(3), 463-474.

Spivak, M. (1979). *A Comprehensive Introduction to Differential Geometry* (3rd ed.). Wilmington: Publish or Perish.

Szolgay, P., Szatmari, I., & László, K. (1997). A fast fixed point learning method to implement associative memory on CNN's. *IEEE Trans. Circuits and Systems, Fundamental Theory and Applications*, 44(4), 362-366.

Szu, H., Telfer, B., & Garcia, J. (1996). Wavelet transforms and neural networks for compression and recognition. *Neural Networks*, 9(4), 695-708.

Taylor, A. E., & Lay, D. C. (1980). *Introduction to Functional Analysis* (2nd ed.). New York: Wiley & Sons.

Taylor, J. (2005). Neural networks of the brain: Their analysis and relation to brain images. *Proceedings of the International Joint Conference on Neural Neworks*, 1603-1608.

Thompson, K. (1990). Alpha Blending. In A. Glassner (Ed.), *Graphics Gems*, 210-211. Cambridge: Academic Press.

Thuillard, M. (2002). A review of wavelet networks, wavenets, fuzzy wavenets and their applications. In *Advances in Computational Intelligence and Learning: Methods and Applications*. Deventer: Kluwer.

Tiňo, P., Horne, B. G., Giles, C. L., & Collingwood, P. C. (1998). Finite state machines and recurrent neural networks—Automata and dynamical systems approaches. In O. Omidvar & J. Dayhoff (Eds.), *Neural Networks and Pattern Recognition*. San Diego: Academic Press.

Vanhala, J., & Kaski, K. (1993). Cellular associative memory. *Proceeding of 1993 International Joint Conference on Nueral Netowrks*, 1458-1461.

Van Hulle, M. M., (2000). *Faithful Representation and Topographic Maps: From Distortion-to Information-Based Self-Organization*. New York: Wiley-Interscience.

Vogels, T. P., Rajan, K., & Abbott, L. F. (2005). Neural network dynamics. *Annual Rev. Neuroscience*, 28, 357-376.

Wallace, M. T., Meredith, M. A., & Stein, B. E. (1993). Converging influences from visual, auditory and somatosensory cortices onto output neurons of the superior colliculus. *J. Neurophysiology*, 69, 1797-1809.

Wang, T. W., Zhuang X., & Xing, X., (1992). Weighted learning of bidirectional associative memories by global minimization. *IEEE Trans. Neural Networks*, 3(6), 1010-1018.

Willshaw, D. J., Buneman, O. P., & Longuet-Higgins, H. C. (1969). Non-holographic associative memory. *Nature*, 222, 960-962.

Wolpert, D. H., & MacLennan, B. J. (1993). A computationally universal field computer that is purely linear. *Tech Rep. UT-CS-93-206*, University of Tennessee.

Wu, J. W., & Lian, K. Y. (2006). Cellular neural field and its convergence analysis. *IEEE Trans. Neural Networks*, 17(6), 1639-1641.

Wu, Y., & Pados, D. A. (2000). A feedforward bidirectional associative memory. *IEEE Trans. Neural Networks*, 11(4), 859-866.

Xu, Z., Leung, Y., & He, X. (1994). Asymmetrical bidirectional associative memories. *IEEE Trans. Systems, Man, and Cybernetics*, 24(10), 1558-1564.

Zhang, J., Walter, G. G., Miao, Y., & Lee, W. N. W. (1995). Wavelet neural networks for function learning. *IEEE Trans. Signal Processing*, 43(6), 1485-1497.

Zhang, Q., & Benveniste, A. (1992). Wavelet networks. *IEEE Trans. Neural Networks*, 3(6), 889-898.

The invention claimed is:

1. A method for generating a spatially-encoded output signal from an input signal having a structure comprising a plurality of discrete signal units, the method comprising:

inputting the input signal into a computer processor having software stored therein for executing a plurality of processing elements, wherein each processing element comprises a logic manifold association processor having an input and an output, and wherein each processing element generates a single output signal;

transforming the input signal into representations defined on manifolds of one of a physical space, a projective geometry, and topological manifolds of rotations or translations;

forming a recursive loop between a pair of processing elements, wherein the output of each processing element of the pair of processing elements is fed back into the input of the other processing element of the pair, and wherein at least one of the pair of processing elements further receives an element input comprising a small subset of the plurality of discrete signal units of the input signal;

training a plurality of pairs of processing elements to detect and form associations between a plurality of reciprocal signal pairs, wherein when a first signal of a reciprocal signal pair of the plurality is input into a first processing element, the first processing element outputs a second signal of the reciprocal signal pair, and when the second signal of the reciprocal signal pair is input into a second processing element, the second processing element outputs the first signal, so that the reciprocal signal pair converges to a fixed signal that is locked within the pair of processing elements;

wherein when the at least one of the pair of processing elements that receives the small subset of discrete signal units receives the input signal units, the two processing elements generate an encoded output comprising spatial information associated with the subset of input signal units; and storing the encoded output in a memory in communication with the computer processor.

2. The method of claim 1, wherein the discrete signal units within the input signal have corresponding spatial locations that are encoded with a frequency representation, wherein each processing element encodes a different grid of spatial locations.

3. The method of claim 1, wherein the input signal further comprises temporal knowledge where a product manifold is formed with the spatial manifolds and a time manifold, or a frequency representation of time, the resulting knowledge encoding events corresponding to a unique time and place.

4. The method of claim 1, wherein the input signal is a three-dimensional image and the step of transforming comprises aligning the image with a plane of symmetry.

* * * * *